United States Patent
Yamashita et al.

(10) Patent No.: US 7,740,968 B2
(45) Date of Patent: Jun. 22, 2010

(54) ION-CONDUCTIVE BINDER MEMBRANE-ELECTRODE ASSEMBLY AND FUEL CELL

(75) Inventors: Takashi Yamashita, Tsukuba (JP); Shinji Nakai, Tsukuba (JP); Hiroyuki Ogi, Tsukuba (JP); Tomohiro Ono, Tsukuba (JP); Masahiro Rikukawa, Chiyoda-ku (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 0 days.

(21) Appl. No.: 11/722,251

(22) PCT Filed: Dec. 20, 2005

(86) PCT No.: PCT/JP2005/023840

§ 371 (c)(1),
(2), (4) Date: Jun. 20, 2007

(87) PCT Pub. No.: WO2006/068279

PCT Pub. Date: Jun. 29, 2006

(65) Prior Publication Data

US 2008/0113244 A1    May 15, 2008

(30) Foreign Application Priority Data

Dec. 20, 2004 (JP) .............................. 2004-367573

(51) Int. Cl.
*H01M 8/10* (2006.01)
*C08J 5/20* (2006.01)

(52) U.S. Cl. .............................. 429/33; 429/30; 429/12; 521/25; 521/27

(58) Field of Classification Search .................... 429/33, 429/30, 12
See application file for complete search history.

(56) References Cited

U.S. PATENT DOCUMENTS

2002/0155340 A1   10/2002   Nanaumi et al.
2003/0064268 A1   4/2003    Fukuda et al.
2007/0114497 A1*  5/2007    Iino et al. ................... 252/500
2007/0178349 A1*  8/2007    Iino et al. ................... 429/34

FOREIGN PATENT DOCUMENTS

| JP | 2-7398 | 2/1990 |
|----|--------|--------|
| JP | 3-208260 | 9/1991 |
| JP | 11-273695 | 10/1999 |
| JP | 2000-513484 | 10/2000 |

(Continued)

OTHER PUBLICATIONS

U.S. Appl. No. 12/162,375, filed Jul. 28, 2008, Ono, et al.
U.S. Appl. No. 12/278,794, filed Aug. 8, 2008, Ono, et al.
U.S. Appl. No. 12/523,814, filed Jul. 20, 2009, Ohgi, et al.

*Primary Examiner*—Dah-Wei Yuan
*Assistant Examiner*—Angela J. Martin
(74) *Attorney, Agent, or Firm*—Oblon, Spivak, McClelland, Maier & Neustadt, L.L.P.

(57) ABSTRACT

This invention relates to an ion-conducting binder used for a membrane electrode assembly for polymer electrolyte fuel cells, the assembly consisting of a polymer electrolyte membrane and two gas diffusion electrodes stuck to the polymer electrolyte membrane with the membrane put between the electrodes, which binder comprises a block copolymer which comprises a polymer block (A) having as a main unit an aromatic vinyl compound unit whose α-carbon is quaternary carbon, and a flexible polymer block (B), and has ion-conducting groups on the polymer block (A), and a solution or suspension thereof, and a membrane electrode assembly and a polymer electrolyte fuel cell.

The ion-conducting binder, membrane electrode assembly and polymer electrolyte fuel cell of this invention are economical, mild to the environment and excellent in moldability and oxidation stability.

17 Claims, 2 Drawing Sheets

FOREIGN PATENT DOCUMENTS

| | | |
|---|---|---|
| JP | 2000-331693 | 11/2000 |
| JP | 2001-210336 | 8/2001 |
| JP | 2002-164055 | 6/2002 |
| JP | 2002-216777 | 8/2002 |
| JP | 2002-216801 | 8/2002 |
| JP | 2002-367626 | * 12/2002 |
| JP | 2004-247185 | 9/2004 |
| WO | WO 02/15313 A1 | 2/2002 |

* cited by examiner

ION-CONDUCTIVE BINDER MEMBRANE-ELECTRODE ASSEMBLY AND FUEL CELL

TECHNICAL FIELD

This invention relates to an ion-conducting binder used in a membrane electrode assembly composing a polymer electrolyte fuel cell, a membrane electrode assembly using the ion-conducting binder, and a polymer electrolyte fuel cell using the membrane electrode assembly.

BACKGROUND ART

In recent years, as a power generation system which is mild to the global environment and clean, fuel cells have drawn attention. Fuel cells are classified into a phosphoric acid type, a molten carbonate type, a solid oxide type, a polymer electrolyte type, etc. Among them, polymer electrolyte fuel cells are tried to be applied as power sources for electric automobiles, power sources for portable apparatuses, and, further, applied to domestic cogeneration systems utilizing electricity and heat at the same time, from the viewpoints of workability at low temperatures, miniaturization and lightening, etc.

A polymer electrolyte fuel cell is generally composed as follows. First, on both sides of an electrolyte membrane having proton conductivity, catalyst layers comprising a platinum group metal catalyst supported on carbon powder and an ion-conducting binder (the ions are usually protons) comprising a polymer electrolyte are formed, respectively. On the outsides of the catalyst layers, gas diffusion layers as porous materials through which fuel gas and oxidant gas can pass are formed, respectively. As the gas diffusion layers, carbon paper, carbon cloth, etc. are used. An integrated combination of the catalyst layer and the gas diffusion layer is called a gas diffusion electrode, and a structure wherein a pair of gas diffusion electrodes are stuck to the electrolyte membrane so that the catalyst layers can face to the electrolyte membrane, respectively is called a membrane electrode assembly (MEA). On both sides of the membrane electrode assembly, separators having electric conductivity and gastightness are placed. Gas passages supplying the fuel gas or oxidant gas (e.g., air) onto the electrode surfaces are formed, respectively, at the contact parts of the membrane electrode assembly and the separators or inside the separators. Power generation is started by supplying a fuel gas such as hydrogen gas or methanol to one electrode (fuel electrode) and an oxidant gas containing oxygen such as air to the other electrode (oxygen electrode). Namely, the fuel gas is ionized at the fuel electrode to form protons and electrons, the protons pass through the electrolyte membrane and transferred to the oxygen electrode, the electrons are transferred via an external circuit formed by connecting both electrodes into the oxygen electrode, and they react with the oxidant gas to form water. Thus, the chemical energy of the fuel gas is directly converted into electric energy which can be taken out.

Further, in addition to such proton exchange-type fuel cells, anion exchange-type fuel cells using an anion-conducting membrane and an anion-conducting binder (the anions are usually hydroxide ions) are also studied. It is known that in anion exchange-type fuel cells, overvoltage at the oxygen electrode is reduced, and the improvement of energy efficiency is expected. Further, it is said that, when methanol is used as fuel, methanol crossover wherein methanol passes through the electrolyte membrane between the electrodes is reduced. The constitution of a polymer electrolyte fuel cell in this case is basically the same as in the proton exchange-type fuel cell except that an anion-conducting membrane and an anion-conducting binder are used in place of the proton-conducting membrane and the proton-conducting binder, respectively. As to the mechanism of generation of electric energy, oxygen, water and electrons react at the oxygen electrode to form hydroxide ions, the hydroxide ions pass through the anion-conducting membrane and react with hydrogen at the fuel electrode to form water and electrons, and the electrons are transferred via an external circuit formed by connecting both electrodes into the oxygen electrode and react again with oxygen and water to form hydroxide ions. Thus, the chemical energy of the fuel gas is directly converted into electric energy which can be taken out.

In both proton exchange-type fuel cells and anion exchange-type fuel cells, the above electrode reactions take place at the boundary of the three phases of the catalyst surface, the fuel gas or oxidant gas and the ion-conducting binder as a polymer electrolyte, with the catalyst layer as a reaction site. The ion-conducting binder is used for the purpose of binding the catalyst and heightening the utilization efficiency of the catalyst by mediating the transfer of protons or hydroxide ions from the catalyst layer to the electrolyte membrane. Therefore, catalyst particles not covered with the ion-conducting binder cannot take part in the formation of the three-phase boundary, and it is hard for such particles to contribute to the reaction. Further, in order to obtain high efficiency, the minute structural design of the catalyst layer including pore structure for diffusing fuel gas or oxidant gas, the dispersion state of the catalyst, etc. becomes important. Further, at the gas diffusion electrode part, there arises a case where the catalyst surface is covered with water contained in the reaction gas or formed at the oxygen electrode and the fuel gas or oxidant gas cannot contact with the catalyst surface, and as a result, power generation is stopped, or a case where such water prevents the fuel gas or oxidant gas from being supplied or discharged to stop the electrode reaction. Therefore, the water repellency of the gas diffusion electrode part is required.

As to the joint of the gas diffusion electrode and the electrolyte membrane, a method wherein the joint is carried out by hot press is known. However, since it is hard to obtain good joint strength and good electric contact state by mere hot press, it is preferred to heighten the adhesion between the gas diffusion electrode and the electrolyte membrane by applying an ion-conducting binder as an adhesive resin on the catalyst layer surface of the gas diffusion electrode. In such application, the ion-conducting binder is used generally in a solution sate.

As ion conducting binders used in proton exchange-type fuel cells (cation-conducting binders), Nation (registered trade mark of Dupont Co., as is the same hereinafter) which is a perfluorosulfonic acid-type polymer as mentioned in JP-B-2-7398 and JP-A-3-208260 is generally used because it is chemically stable. However, Nation is a fluoropolymer and very expensive. Further, fluorine-containing polymers contain fluorine and consideration to the environment is necessary at the time of synthesis and disposal.

In view of these problems, cation-conducting binders in place of fluoropolymers have been developed. For example, aromatic engineering plastic type resins in which an ion-conducting group such as a sulfonic acid group is introduced is studied. Besides aromatic engineering plastic-type resins, cation-conducting binders comprising styrene type thermoplastic elastomers have been proposed (JP-A-2002-164055 and JP-Tokuhyo-2000-513484). For example, sulfonated SEES (SEBS is an abbreviation of polystyrene-poly(ethylene-butylene)-polystyrene tri-block copolymer) is proposed, and it is disclosed that it is sparingly soluble in water, and has good joint strength with an electrolyte membrane.

On the other hand, as anion-conducting binders used in anion exchange-type fuel cells, one wherein the sulfonic acid groups of perfluorosulfonic acid-type polymers are converted to anion exchange groups is known. For example, one obtained by copolymerizing tetrafluoroethylene with $CF_2=CFOCF_2CF(CF_3)O(CF_2)_2SO_3F$ and then making N,N, N'-trimethylethylenediamme act thereon is disclosed in JP-A-2000-331693 (paragraph 0026). However, this ion-conducting binder has the same drawback as Nafion. As another anion-conducting binder, an anion exchange resin obtained by chrromethylating a copolymer of an aromatic polyethersulfone with an aromatic polythioethersulfone and then aminating the resulting compound is disclosed in JP-A-11-273695 (paragraph 0046). As still another anion-conducting binder, an anion-conducting binder obtained by introducing a quaternary ammonium group into a polystyrene-poly (ethylene-butylene)-polystyrene tri-block copolymer or the like is disclosed in JP-A-2002-367626 (paragraphs 0041 and 0045).

DISCLOSURE OF INVENTION

However, many of cation-conducting binders comprising aromatic engineering plastic-type resins have high affinity to water, and such cation-conducting binders themselves are gradually eluted outside the cell with moisture contained in the reaction gas during power generation or water formed at the oxygen electrode, and deterioration of the electrodes progresses, and thus, sufficient operation time cannot be secured. Although it is possible to make such cation-conducting binders sparingly soluble in water by reducing the amount of the cation-conducting groups introduced, the resulting cation-conducting binders cannot display sufficient cation conductivity, and high power cannot be obtained. Although a resin made to be water insoluble by introduction of a crosslinking group is also studied, the resulting resin is insoluble in organic solvents and needs to be used as a suspension in a suitable solvent, and the suspension is poor in dispersibility into the catalyst layer, and thus, it is hard to form an effective three-phase boundary, Further, in ion-conducting binders used for electrode catalyst layers constituting polymer electrolyte fuel cells, lowering of ion conductivity and elution of the ion-conducting binders themselves outside the cell due to decomposition of the polymer skeleton with hydrogen peroxide formed by side reaction in the electrode reaction or hydroxyl radicals derived from the hydrogen peroxide are observed. It is presumed that since SEBS has unstable tertiary carbon in the structure, chemical stability, particularly oxidation stability including radical resistance is inadequate. When we actually made experiments, it was revealed that its radical resistance is inadequate. This means that deterioration of the ion-conducting binder progresses during power generation, and thus, time allowable for operation is restricted.

Anion-conducting binders comprising fluoropolymers have the same drawbacks as Nation. Anion-conducting binders comprising copolymers of aromatic polyethersulfones with aromatic polythioethersulfones have high affinity to water, and have the same drawbacks as the above-mentioned aromatic engineering plastic-type cation-conducting binders. Anion-conducting binders comprising polystyrene-poly (ethylene-butylene)-polystyrene tri-block copolymers have the same drawbacks as the above-mentioned cation-conducting binders having the similar skeletons.

Thus, it is the present state of things that ion-conducting binders which are economical, do not contain fluorine and are excellent in oxidation stability are not proposed.

This invention aims to provide an ion-conducting binder which is economical, mild to the environment, excellent in moldability, and further excellent in oxidation stability and thus durability, and a membrane electrode assembly using the ion-conducting binder and a polymer electrolyte fuel cell using the membrane electrode assembly.

The present inventors have intensely studied for solving the above problems, and as a result, they found that a block copolymer which has, as its constituents, a polymer block (A) having as a unit an aromatic vinyl compound unit whose α-carbon is quaternary carbon, and a flexible polymer block (B), and wherein either the polymer block (A) has monovalent cation-conducting groups or monovalent anion-conducting groups, or the polymer block (A) themselves are bonded with anion-conducting groups are excellent in moldability and oxidation stability as an ion-conducting binder, and completed the invention.

Namely, the invention relates to an ion-conducting binder used for a membrane electrode assembly for polymer electrolyte fuel cells, the assembly consisting of a polymer electrolyte membrane and two gas diffusion electrodes stuck to the polymer electrolyte membrane with the membrane put between the electrodes, which binder comprises, as their constituents, a block copolymer which comprises a polymer block (A) having as a main unit (=a main repeating unit) an aromatic vinyl compound unit whose α-carbon is quaternary carbon, and a flexible polymer block (B), and has ion-conducting groups on polymer block (A), In the above block copolymer, polymer block (A) and polymer block (B) have a property that they go into microphase separation and polymer block (A) themselves and polymer block (B) themselves gather, respectively, and since polymer block (A) has ion-conducting groups, continuous phases (ion channels) are formed by the gathering of polymer block (A) themselves and serve as paths of cations (usually, protons) or anions (usually, hydroxide ions). By the presence of polymer block (B), the block copolymer takes on elasticity and becomes flexible as a whole, and in production of membrane electrode assemblies and polymer electrolyte fuel cells, moldability (assembling properties, joint properties, fastening properties, etc.) is improved. Flexible polymer block (B) is composed of alkene units, conjugated diene units or the like. The aromatic vinyl compound unit whose α-carbon is quaternary carbon includes an aromatic vinyl compound unit wherein the hydrogen atom bonded to the α-carbon is replaced with an alkyl group, a halogenated alkyl group or a phenyl group, etc. The ion-conducting group is bonded to polymer block (A), and this is necessary for heightening of oxidation stability.

In the block copolymer used in the invention, the ion-conducting groups are monovalent cation-conducting groups or anion-conducting groups, and in the latter case, the polymer block (A) has monovalent anion-conducting groups, or polyvalent anion-conducting groups are bonded so as to crosslink the polymer blocks (A) and/or so as to crosslink the aromatic vinyl compound units inside the polymer block (A).

The cation-conducting group includes a sulfonic acid group and a phosphonic acid group and their salts. The anion-conducting group includes an ammonium group optionally substituted with an alkyl group having 1 to 8 carbon atoms; a pyridinium group having a methyl group or an ethyl group bonded to the nitrogen atom or a pyridyl group which formed a salt with an acid; an imidazolium group having a methyl group or an ethyl group bonded to the nitrogen atom bonded to the nitrogen atom or an imidazolyl group which formed a salt with an acid; a phosphonium group optionally substituted with a methyl group or an ethyl group; a monovalent or bivalent group wherein at least one of the two nitrogen atoms of ethylene diamine whose hydrogen atom(s) bonded to the nitrogen atoms can be replaced with a methyl group or an ethyl group is a bonding site, a monovalent or bivalent group wherein at least one of the two nitrogen atoms of tri- to hexα-ethylenediamine whose hydrogen atom(s) bonded to the nitrogen atoms can be replaced with a methyl group or an ethyl group is a bonding site; a monovalent or bivalent group wherein at least one of the two nitrogen atoms of methylenediamine wherein the hydrogen atom(s) bonded to the nitrogen atoms can be replaced with a methyl group or an ethyl group is a bonding site; a monovalent, bivalent or trivalent group wherein at least one of the three nitrogen atoms of diethyleneior bis(trimehtylene))triamine wherein the hydrogen atom(s) bonded to the nitrogen atoms can be replaced with a methyl group or an ethyl group is a bonding site; etc.

The invention also relates to a solution or a suspension containing the ion-conducting binder. The invention also relates to a membrane electrode assembly using the ion-conducting binder and a fuel cell using the membrane electrode assembly.

BEST MODE FOR CARRYING OUT THE INVENTION

Figure 1:
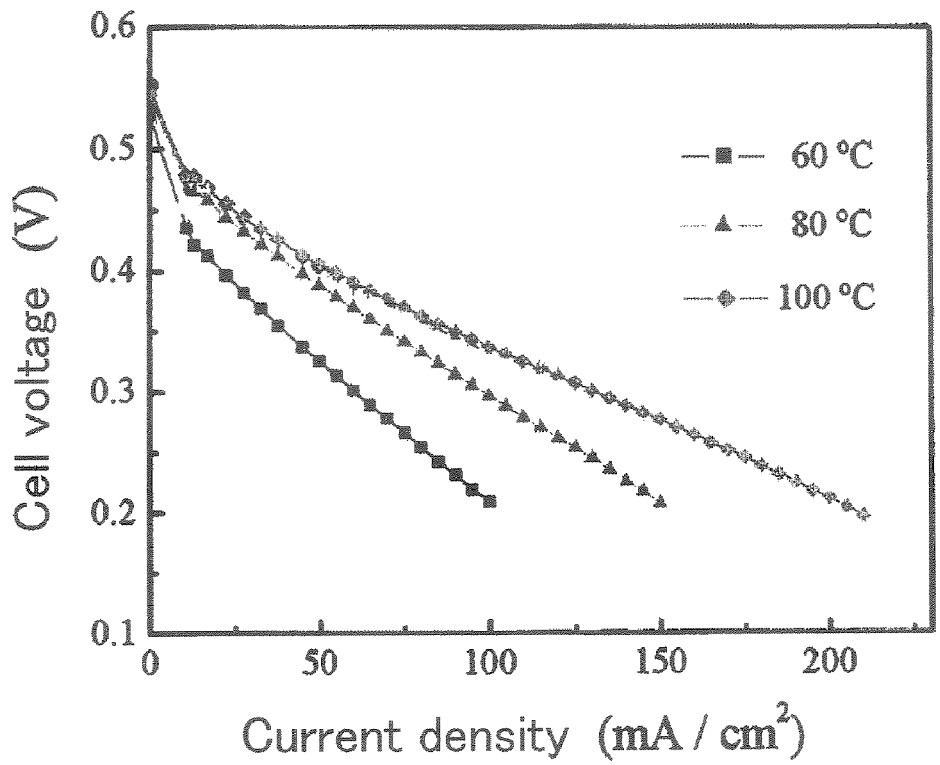
FIG. 1 is a drawing showing the current density-cell voltage of a single cell for proton exchange-type polymer electrolyte fuel cells (Example 2 (3)).

The invention is described in detail below. The block copolymer constituting the ion-conducting binder of the invention has, as a constituent, a polymer block (A) having as a main unit (=a main repeating unit) an aromatic vinyl compound unit whose α-carbon is quaternary carbon, and having ion-conducting groups.

The aromatic vinyl compound whose α-carbon is quaternary carbon is preferably an aromatic vinyl compound wherein the hydrogen atom bonded to the α-carbon is replaced with an alkyl group having 1 to 4 carbon atoms (a methyl group, an ethyl group, a n-propyl group, an isopropyl group, a n-butyl group, an isobutyl group, a tort-butyl group or the like), a halogenated alkyl group having 1 to 4 carbon atoms (a chloromethyl group, a 2-chloroethyl group, a 3-chloroethyl group or the like) or a phenyl group. As the aromatic vinyl compound constituting the skeleton, there can be mentioned styrene, vinylnaphthalene, vinyl anthracene, vinylpyrene, vinylpyridine, etc. The hydrogen atoms bonded to the aromatic ring of the aromatic vinyl compound can be replaced with 1 to 3 substituents, and as the substituents, there can be mentioned, each independently, alkyl groups each having 1 to 4 carbon atoms (methyl groups, ethyl groups, n-propyl groups, isopropyl groups, n-butyl groups, isobutyl groups, tert-butyl groups, etc.), halogenated alkyl groups each having 1 to 4 carbon atoms (chloromethyl groups, 2-chloroethyl groups, 3-chloroethyl groups, etc.), etc. As a preferred specific example of the aromatic vinyl compound whose α-carbon is quaternary carbon, there can be mentioned α-methylstyrene. The aromatic vinyl compounds whose α-carbon is quaternary carbon can be used alone or in a combination of two or more. When two or more are copolymerized, the form of the copolymerization can be random copolymerization, block copolymerization, graft copolymerization or tapered copolymerization.

Polymer block (A) can contain one or plural kinds of other monomer units so long as they do not spoil the effects of the invention. Such other monomers include, for example, aromatic vinyl compounds [styrene, styrene whose hydrogen atoms bonded to the benzene ring can be replaced with 1 to 3 alkyl groups (methyl groups, ethyl groups, n-propyl groups, isopropyl groups, n-butyl groups, isobutyl groups, tert-butyl groups, etc.), vinylnaphthalene, vinylanthracene, vinylpyrene, vinylpyridine, etc.]; conjugated dienes having 4 to 8 carbon atoms (specific examples are the same as in the description of polymer block (B) mentioned later); alkenes having 2 to 8 carbon atoms (specific examples are the same as in the description of polymer block (B) mentioned later); (meth)acrylic esters (methyl (meth)acrylate, ethyl (meth) aerylate, butyl (meth)acrylate, etc.); vinyl esters (vinyl acetate, vinyl propionate, vinyl butyrate, vinyl pivalate, etc.); vinyl ethers (methyl vinyl ether, isobutyl vinyl ether, etc.); etc. The form of the copolymerization of the aromatic vinyl compound whose α-carbon is quaternary carbon with the above other monomers needs to be random copolymerization.

The proportion of the aromatic vinyl compound unit whose α-carbon is quaternary carbon in polymer block (A) is preferably 50% by mass or more, more preferably 70% by mass or more, still more preferably 90% by mass or more, of polymer block (A), in view of giving sufficient oxidation stability to the ion-conducting binder finally obtained.

The molecular weight of polymer block (A) is suitably chosen depending on the nature and state of the ion-conducting binder, desired performance, other polymer components, etc. When the molecular weight is large, dynamic characteristics such as tensile strength of the ion-conducting binder tend to be higher, whereas when the molecular weight is small, the electric resistance of the ion-conducting binder tens to be smaller, and it is important to suitably choose the molecular weight m accordance with necessary performance. Usually, the molecular weight is preferably chosen between 100 and 1,000,000, and more preferably chosen between 1,000 and 100,000, as number average molecular weight in terms of polystyrene.

The block copolymer used in the ion-conducting binder of the invention has flexible polymer block (B) besides polymer block (A). Polymer block (A) and polymer block (B) have a property that they go into micro-phase separation and polymer block (A) themselves and polymer block (B) themselves gather, respectively, and since polymer block (A) has ion-conducting groups, ion channels as continuous phases are formed by the gathering of polymer block (A) themselves and serve as paths of cations (usually, protons) or anions (usually, hydroxide ions). By the presence of polymer block (B), the block copolymer takes on elasticity and becomes flexible as a whole, and in production of membrane electrode assemblies and polymer electrolyte fuel cells, moldability (assembling properties, joint properties, fastening properties, etc.) is improved. Such polymer block (B) is a so-called rubber-dike polymer block whose glass transition point or softening point is 50° C. or less, preferably 20° C. or less, more preferably 10° C. or less.

As monomers capable of constituting the unit (=the repeating unit) constituting flexible polymer block (B), there can be mentioned alkenes having 2 to 8 carbon atoms; cycloalkenes having 5 to 8 carbon atoms; vinycycloalkenes having 7 to 10 carbon atoms; conjugated dienes having 4 to 8 carbon atoms; conjugated cycloalkadienes having 5 to 8 carbon atoms; vinycycloalkenes having 7 to 10 carbon atoms wherein part or all of the carbon-carbon double bonds are hydrogenated; conjugated dienes having 4 to 8 carbon atoms wherein part or all of the carbon-carbon double bonds are hydrogenated; conjugated cycloalkadienes having 5 to 8 carbon atoms wherein part or all of the carbon-carbon double bonds are hydrogenated; (meth) acrylic esters; vinyl esters; vinyl ethers; etc. These can be used alone or in a combination of two or more. When two or more are polymerized (copolymerized), the form thereof can be random copolymerization, block copolymerization, graft copolymerization or tapered copolymerization. When a monomer used in the (co)polymerization has two carbon-carbon double bonds, any of them can be used in the polymerization, and in the case of a conjugated diene either of 1,2-bond and 1,4-bond will do, and so long as the glass transition point or softening point is 50° C. or less, there is no particular restriction on the proportion between 1,2-bond and 1,4-bond.

In the above, alkenes having 2 to 8 carbon atoms include ethylene, propylene, 1-butene, 2-butene, isobutene, 1-pentene, 2-pentene, 1-hexene, 2-hexene, 1-heptene, 2-heptene, 1-octene, 2-oetene, etc.; cycloalkenes having 5 to 8 carbon atoms include cyelopentene, cyclohexene, cycloheptene, cyclooctene, etc.; vinylcycloalkenes having 7 to 10 carbon atoms include vinylcyclopentene, vinylcyclohexene, vinylcycloheptene, vinylcyclooctene, etc.; conjugated dienes having 4 to 8 carbon atoms include 1,3-butadiene, 1,3-pentadiene, isoprene, 1,3-hexadiene, 2,4-hexadiene, 2,3-dimethyl-1, 3-butadiene, 2-ethyl-1,3-butadiene, 1,3-heptadiene, 1,4-heptadiene, 3,5-heptadiene, etc.; and conjugated cycloalkadienes having 5 to 8 carbon atoms include cyclopentadiene, 1,3-cyclohexadiene, etc. (Meth) acrylic esters include methyl (meth)acrylate, ethyl (meth)acrylate, butyl (meth)acrylate, etc.; vinyl esters include vinyl acetate, vinyl propionate, vinyl butyrate, vinyl pivalate, etc.; and vinyl ethers include methyl vinyl ether, isobutyl vinyl ether, etc.

When the unit constituting polymer block (B) has a carbon-carbon double bond as in a vinylcycloalkene unit, a conjugated diene unit or a conjugated cycloalkadiene unit, it is preferred that 30% by mol or more of the carbon-carbon double bonds is hydrogenated, it is further preferred that 50% by mol or more of the carbon-carbon double bonds is hydrogenated, and it is still further preferred that 80% by mol or more of the carbon-carbon double bonds is hydrogenated, in view of enhancement of the power generation performance and/or heat deterioration resistance of membrane electrode assemblies using the ion-conducting binder of the invention, etc. The proportion of hydrogenation of the carbon-carbon double bonds can be calculated according to a method generally used, for example, a method of measuring iodine number, $^1$H-NMR measurement, or the like.

In view of giving elasticity, and good moldability in production of membrane electrode assemblies and polymer electrolyte fuel cells to block copolymers to be obtained, polymer block (B) is preferably a polymer block comprising at least one unit selected from an alkene unit having 2 to 8 carbon atoms, a cycloalkene unit having 5 to 8 carbon atoms, a vinylcycloalkene unit having 7 to 10 carbon atoms, a conjugated diene unit having 4 to 8 carbon atoms, a conjugated cycloalkadiene unit having 5 to 8 carbon atoms, a vinycycloalkenes unit having 7 to 10 carbon atoms wherein part or all of the carbon-carbon double bonds are hydrogenated, a conjugated diene unit having 4 to 8 carbon atoms wherein part or all of the carbon-carbon double bonds are hydrogenated, and a conjugated cycloalkadiene unit having 5 to 8 carbon atoms wherein part or all of the carbon-carbon double bonds are hydrogenated; polymer block (B) is more preferably a polymer block comprising at least one unit selected from an alkene unit having 2 to 8 carbon atoms, a conjugated diene unit having 4 to 8 carbon atoms and a conjugated diene unit having 4 to 8 carbon atoms wherein part or all of the carbon-carbon double bonds are hydrogenated; and polymer block (B) is still more preferably a polymer block comprising at least one unit selected from an alkene unit having 2 to 6 carbon atoms, a conjugated diene unit having 4 to 8 carbon atoms and a conjugated diene unit having 4 to 8 carbon atoms wherein part or all of the carbon-carbon double bonds are hydrogenated. In the above, most preferably as the alkene unit having 2 to 6 carbon atoms is an isobutene unit, and most preferably as the conjugated diene unit is a 1,3-butadiene unit and/or an isoprene unit.

Polymer block (B) can contain, besides the above monomer unit(s), another monomer unit, for example a unit of an aromatic vinyl compound such as styrene or vinylnaphthalene or a halogen-containing vinyl compound such as vinyl chloride, so long as it does not spoil the purposes of polymer block (B) of giving elasticity to the block copolymer. In this case, the form of the copolymerization of the above monomer with another monomer needs to be random copolymerization. The use amount of such another monomer is preferably less than 50% by mass, more preferably less than 30% by mass, still more preferably less than 10% by mass, based on the total of the above monomer and another monomer.

The structure of the block copolymer comprising polymer block (A) and polymer block (B) as constituents is not particularly limited, and there can be mentioned, as its examples, an A-B-A triblock copolymer, a B-A-B triblock copolymer, a mixture of an A-B-A triblock copolymer or a B-A-B triblock copolymer with an A-B diblock copolymer, an A-B-A-B tetrablock copolymer, an A-B-A-B-A pentablock copolymer, a B-A-B-A-B pentablock copolymer, an (A-B)$_n$X star form copolymer (X represents the residue of a coupling agent), a (B-A)$_n$X star form copolymer (X represents the residue of a coupling agent), etc. These block copolymers can be used alone or in a combination of two or more.

The mass ratio of polymer block (A) to polymer block (B) is preferably 95:5 to 5:95, more preferably 90:10 to 10:90 and most preferably 50:50 to 10:90. When this mass ratio is 95:5 to 5:95, it is advantageous for the ion channel formed with polymer block (A) by micro phase separation to be a cylindrical state or a continuous phase, and practically sufficient ion conductivity is displayed, and since the proportion of hydrophobic polymer block (B) gets appropriate and good water resistance is attained, the outflow of the ion-conducting binder during power generation can be prevented.

The block copolymer constituting the ion-conducting binder of the invention can contain another polymer block (C) different from polymer block (A) and polymer block (B).

Polymer block (C) is not limited so long as it is a component going into micro phase separation from polymer block (A) and polymer block (B). As monomers capable of constituting polymer block (C), there can, for example, be mentioned aromatic vinyl compounds [styrene, styrene whose hydrogen atoms bonded to the benzene ring can be replaced with 1 to 3 alkyl groups (methyl groups, ethyl groups, n-propyl groups, isopropyl groups, n-butyl groups, isobutyl groups, tert-butyl groups, etc.), vinylnaphthalene, vinylanthracene, vinylpyrene, etc.], conjugated dienes having 4 to 8 carbon atoms, alkenes having 2 to 8 carbon atoms, (meth) acrylic esters, vinyl esters, vinyl ethers, etc. In the above, as specific examples of the conjugated dienes having 4 to 8 carbon atoms, alkenes having 2 to 8 carbon atoms, (meth) acrylic esters, vinyl esters and vinyl ethers, the same ones as mentioned in the description of polymer block (B) can be used. The monomer constituting polymer block (C) can be single or plural.

When polymer block (C) is made to have the functions of going into micro phase separation from polymer block (A) and polymer block (B), having substantially no ionic groups and acting as a cramping phase, the block copolymer used in the invention having such polymer block (C) tends to be excellent in shape and form stability, durability, and dynamic characteristics under a wet environment. In this case, as preferred examples of monomers constituting polymer block (C), there can be mentioned the above-mentioned aromatic vinyl compounds. It is also possible to give the above functions by making polymer block (C) crystalline.

When the aromatic vinyl compound unit is relied on for the above functions, the proportion of the aromatic vinyl compound unit in polymer block (C) is preferably 50% by mass or more, more preferably 70% by mass or more and still more preferably 90% by mass or more of polymer block (C). Further, from the same viewpoint as above, it is desirable that units other than the aromatic vinyl compound unit contained in polymer block (C) are in the state of random copolymerization.

In view of micro-phase separating polymer block (C) from polymer block (A) and polymer block (B) and at the same time making it function as a cramping phase, as particularly preferred examples of polymer block (C), there can be mentioned a polystyrene block; a polystyrene-type block such as a poly-p-methylstyrene block or a poly-p-(t-butyl) styrene block; a copolymer block using two or more of styrene, p-methylstyrene and p-(t-butyl) styrene in an arbitrary mutual proportion; a crystalline polyethylene block; a crystalline polypropylene block, etc.

As the forms of the block copolymer in the case of containing polymer block (C) used in the invention, there can be mentioned an A-B-C triblock copolymer, an A-B-C-A tetrablock copolymer, an A-B-A-C tetrablock copolymer, a B-A-B-C tetrablock copolymer, an A-B-C-B tetrablock copolymer, a C-A-B-A-C pentablock copolymer, a C-B-A-B-C pentablock copolymer, an A-C-B-C-A pentablock copolymer, an A-C-B-A-C pentablock copolymer, an A-B-C-A-B pentablock copolymer, an A-B-C-A-C pentablock copolymer, an A-B-C-B-C pentablock copolymer, an A-B-A-B-C pentablock copolymer, an A-B-A-C-B pentablock copolymer, a B-A-B-A-C pentablock copolymer, a B-A-B-C-A pentablock copolymer, a B-A-B-C-B pentablock copolymer, etc.

When the block copolymer constituting the ion-conducting binder of the invention contains polymer block (C), the proportion of polymer block (C) in the block copolymer is preferably 40% by mass or less, more preferably 35% by mass or less and still more preferably 30% by mass or less.

The number average molecular weight of the block copolymer used in the invention, in a state that an ion-conducting group is not introduced, is not particularly limited, but, usually, is preferably 10,000 to 2,000,000, more preferably 15,000 to 1,000,000 and still more preferably 20,000 to 500,000 as number average molecular weight in terms of polystyrene.

The block copolymer constituting the ion-conducting binder of the invention needs to have ion-conducting groups, namely cation-conducting groups or anion-conducting groups on polymer block (A). When ion conductivity is referred to in the invention, cations include protons, etc. and anions include hydroxide ions, etc.

The cation-conducting groups are not particularly limited so long as they are such groups that a membrane electrode assembly produced using the ion-conducting binder of the invention can display sufficient cation conductivity, but above all, a sulfonic acid group or a phosphonic acid group or their salts represented by —SO$_3$M or —PO$_3$HM wherein M represents a hydrogen atom, an ammonium ion or an alkali metal ion, can be used preferably. As the ion-conducting group, a carboxyl group or its salts can also be used. The reason why the introduction site of the ion-conducting group is made to be polymer block (A) is that it is particularly effective to heighten the radical resistance of the entire block copolymer.

The anion-conducting groups are not particularly limited so long as they are such groups that a membrane electrode assembly produced using the ion-conducting binder of the invention can display sufficient anion conductivity, and groups as shown below are mentioned. The reason why the introduction site of the anion-conducting group is made to be polymer block (A) is that it is particularly effective to heighten the oxidation stability of the entire block copolymer.

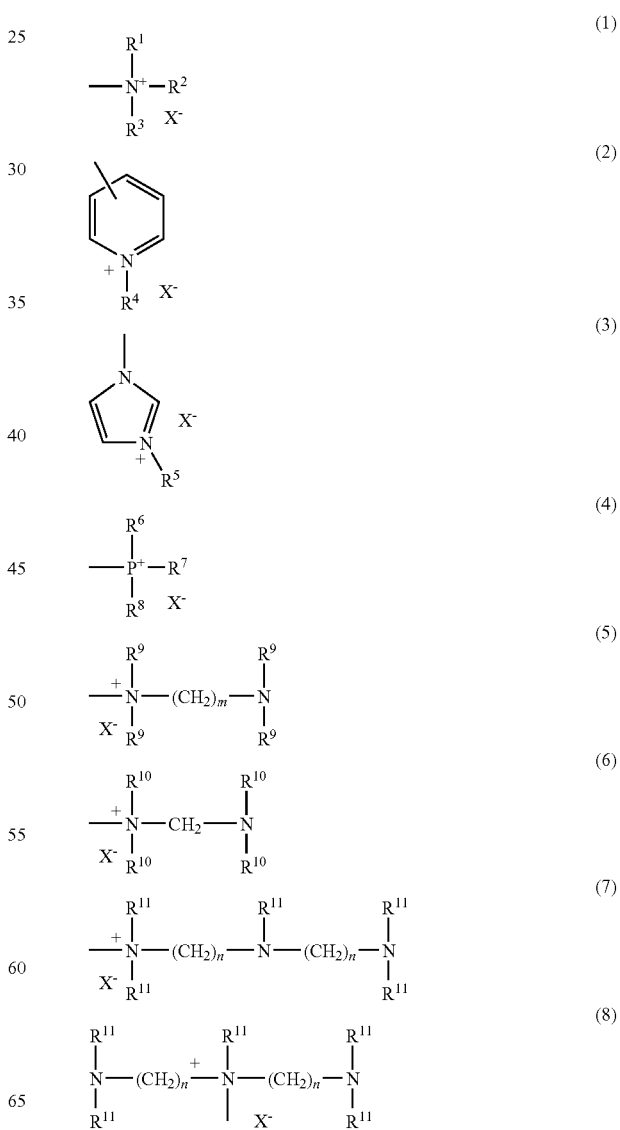

-continued

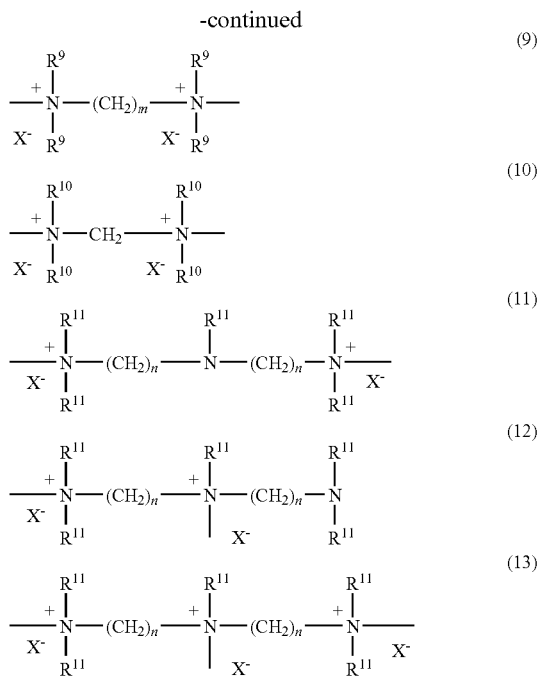

In the above formulae, $R^1$ to $R^3$ represent respectively independently hydrogen atoms or alkyl groups having 1 to 8 carbon atoms, $R^4$ to $R^9$ and $R^{11}$ represent respectively independently hydrogen atoms, methyl groups or ethyl groups, $R^{10}$ represents a methyl group or an ethyl group, X-represents a hydroxide ion or an acid anion, m represents an integer of 2 to 6, and n represents 2 or 3. In the above, as alkyl groups having 1 to 8 carbon atoms, there can he mentioned methyl groups, ethyl groups, n-propyl groups, isopropyl groups, n-butyl groups, n-pentyl groups, n-hexyl groups, n-heptyl groups, 2-ethylhexyl groups, etc. As the acid anion, there is no particular limitation, and there can, for example, be mentioned halide ion (particularly chloride ion), ½ $SO_4^{2-}$, $HSO_4^-$, p-toluenesulfonate anion, etc.

In the above, it is preferred for the realization of high anion conductivity that $R^1$ to $R^9$ and $R^{11}$ are methyl groups or ethyl groups, and X is a hydroxide ion. It is further preferred that $R^1$ to $R^{11}$ are methyl groups.

As to the position of introduction of the cation-conducting groups into polymer block (A), there is no particular restriction, and they can be introduced either into the aromatic vinyl compound units whose α-carbon is quaternary carbon or into the afore-mentioned other monomer units, but in view of enhancement of radical resistance, it is most desirable to introduce the cation-conducting groups into the aromatic ring of the aromatic vinyl compound units whose α-carbon is quaternary carbon.

As to the position of introduction of the anion-conducting groups into polymer block (A), there is no particular restriction, and they can be introduced either into the aromatic vinyl compound units whose α-carbon is quaternary carbon or into the afore-mentioned other monomer units, but in view of enhancement of oxidation stability, it is most desirable to introduce the anion-conducting groups into the aromatic ring of the aromatic vinyl compound units whose α-carbon is quaternary carbon. In these cases, when the anion-conducting group introduced is a monovalent group such as one of (1) to (8) in the above formulae, the group is bonded to polymer block (A), but when it is a polyvalent group such as one of (9) to (13) in the above formulae, the group is bonded so as to crosslink polymer block (A) themselves or so as to crosslink aromatic vinyl compound unit themselves in polymer block (A).

The amount of the ion-conducting group introduced is appropriately chosen depending on the required performance of a block copolymer obtained, etc., but, usually, in order to display sufficient ion conductivity to use it as an ion conducting binder for polymer electrolyte fuel cells, the introduction amount is preferably such an amount that the ion exchange capacity of the block copolymer becomes 0.30 meq/g or more, and is more preferably such an amount that the ion exchange capacity of the block copolymer becomes 0.40 meq/g or more. As to the upper limit of the ion exchange capacity of the block copolymer, since the ion exchange capacity becomes too large, a tendency occurs that hydrophilicity increases and water resistance becomes insufficient, it is preferred that the ion exchange capacity is 3.0 meq/g or less.

Processes for producing a block copolymer used in the invention are mainly classified into two processes. Namely, they are (1) a process which comprises producing a block copolymer not having an ion-conducting group and then bonding an ion-conducting group, and (2) a process which comprises producing a block copolymer using a monomer having an ion-conducting group.

The First Process is Described Below.

Depending on the kind, molecular weight, etc. of monomer(s) constituting polymer block (A) or (B), the process for producing polymer block (A) or (B) is appropriately chosen from a radical polymerization method, an anion polymerization method, a cation polymerization method, a coordination polymerization method and so on, but in view of industrial easiness, a radical polymerization method, an anion polymerization method or a cation polymerization method is preferably chosen. Particularly, in view of molecular weight, molecular weight distribution, the structure of the polymer, easiness of bond to polymer block (B) composed of flexible component(s) or polymer block (A) and so on, a so-called living polymerization method is preferred, and, specifically, a living radical polymerization method, a living anion polymerization method or a living cation polymerization method is preferred.

As specific examples of the production process, a process for producing a block copolymer having its components polymer block (A) composed of poly (α-methylstyrene) and polymer block (B) composed of poly (conjugated diene), and a process for producing a block copolymer having its components polymer block (A) composed of poly (α-methylstyrene) and polymer block (B) composed of polyisobutene are described below. In these cases, in view of industrial easiness, molecular weight, molecular weight distribution, easiness of bond between polymer block (A) and polymer block (B) and so on, it is preferred to produce these block copolymers according to a living anion polymerization method or a living cation polymerization method, and specific synthetic examples as follow can be utilized.

(1) a process of obtaining an A-B-A block copolymer by polymerizing a conjugated diene in tetrahydrofuran as a solvent using a dianion initiator, and then successively polymerizing α-methylstyrene under a temperature condition of −78° C. (Macromolecules, (1969), 2(5), 453-458), (2) a process of obtaining an (A-B)$_n$X block copolymer by bulk polymerizing α-methylstyrene using an anion initiator, successively polymerizing a conjugated diene, and then conducting coupling reaction with a coupling agent such as tetrachlorosilane (Kautsch, Gummi, Kunstst., (1984), 37(5), 377-379: Polym. Bull., (1984), 12, 71-77), (3) a process of obtaining an A-B-A block copolymer by polymerizing α-methylstyrene of a concentration of 5 to 50% by mass in a nonpolar solvent in the presence of a polar compound of a concentration of 0.1 to 10% by mass at a temperature of −30° C. to 30° C. using an organic lithium compound as an initiator, polymerizing a conjugated diene with the resulting living polymer, and then adding a coupling agent, (4) a process of obtaining an A-B-C block copolymer by polymerizing α-methylstyrene of a concentration of 5 to 50% by mass in a nonpolar solvent in the presence of a polar compound of a concentration of 0.1 to 10% by mass at a temperature of −30° C. to 30° C. using an organic lithium compound as an initiator, polymerizing a conjugated diene with the resulting living polymer, and then polymerizing a monomer constituting polymer block (C) with the resulting living polymer of the block copolymer composed of the α-methylstyrene polymer block and the conjugated diene polymer block.

(5) a process of obtaining an A-B-A block copolymer by cation polymerizing isobutene in a mixed solvent of a halogenated hydrocarbon and a hydrocarbon in the presence of a Lewis acid at a temperature of −78° C. using a bifunctional organic halogen compound, addition reacting diphenylethylene, further adding the Lewis acid, and then polymerizing α-methylstyrene (Macromolecules, (1995), 28, 4893-4898), and (6) a process of obtaining an A-B-A block copolymer by polymerizing α-methylstyrene in a mixed solvent of a halogenated hydrocarbon and a hydrocarbon in the presence of a Lewis acid at a temperature of −78° C. using a monofunctional organic halogen compound, further adding the Lewis acid, polymerizing isobutene, and then conducting coupling reaction with a coupling agent such as 2,2-bis-[4-(1-phenylethenyl)phenyl] propane (Polym. Bull., (2000), 45, 121-128).

When a block copolymer having as its components polymer block (A) composed of poly (α-methylstyrene) and polymer block (B) composed of a conjugated diene is produced, the processes of (3) and (4) are adopted as preferred processes, and, particularly, the process of (3) is adopted as a further preferred process, among the above specific production processes for the block copolymer.

When a block copolymer having as its components polymer block (A) composed of poly (α-methylstyrene) and polymer block (B) composed of isobutene is produced, the known process shown in (5) or (6) is adopted.

A process for bonding an ion-conducting group to the resulting block copolymer is described below.

First, a process for introducing a cation-conducting group into the resulting block copolymer is described.

Thereamong, first, a process for introducing a sulfonic acid group into the resulting block copolymer is described. Sulfonation can be conducted by a known sulfonation method. As such a method, there can be exemplified, a process of preparing a solution or suspension of the block copolymer in an organic solvent, and then adding a sulfonating agent and conducting mixing, a process of directly adding a gaseous sulfonating agent to the block copolymer, and the like.

As the sulfonating agent to be used, there can be exemplified sulfuric acid, a mixture system of sulfuric acid and an aliphatic acid anhydride, chlorosulfonic acid, a mixture system of chlorosulfonic acid and trimethylsilyl chloride, sulfur trioxide, a mixt ure system of sulfur trioxide and triethyl phosphate, and, further, an aromatic organic sulfonic acid represented by 2,4,6-trimethylbenzenesulfonie acid, and so on. Further, as the organic solvent to be used, there can be exemplified a halogenated hydrocarbon such as methylene chloride, a straight-chain aliphatic hydrocarbon such as hexane, a cyclic aliphatic hydrocarbon such as cyclohexane, and so on, and they can be used also with an appropriate selection from plural combinations thereof, if necessary.

Next, a process for introducing a phosphonic acid group into the resulting block copolymer is described. Phosphonation can be conducted by a known phosphonation method. Specifically, there can, for example, be mentioned a process of preparing a solution or suspension of the block copolymer in an organic solvent, reacting the copolymer with chloromethyl ether or the like in the presence of anhydrous aluminum chloride to introduce halomehtyl groups into the aromatic rings, reacting the resulting copolymer with phosphorus trichloride and anhydrous aluminum chloride added, and then conducting hydrolysis reaction to introduce phosphonic acid groups; and so on. There can further be exemplified a process of adding phosphorus trichloride and anhydrous aluminum chloride to the copolymer and reacting them to introduce phophimc groups, and then oxidizing the phophinic groups into phophonic groups with nitric acid; and so on.

As to the degree of sulfonation or phosphonation, it is desirable to conduct sulfonation or phosphonation until the ion exchange capacity of the resulting block copolymer becomes 0.30 meq/g or more, particualrly 0.40 meq/g or more, but so that the ion exchange capacity is 3.0 meq/g or less. By this, practical ion conductivity performance can be obtained. The ion exchange capacity of the sulfonated or phosphonated block copolymer, or sulfonation proportion or phosphonation proportion in polymer block (A) of the block copolymer can be calculated using an analytic method such as an acid value titration method, infrared spectroscopy, measurement of nuclear magnetic resonance spectrum ($^1$H-NMR spectrum) or the like.

Secondly, a process for introducing an anion-conducting group into the resulting block copolymer is described. Introduction of an anion-conducting group can be conducted by a known method. For example, the obtained block copolymer is chloromethylated, and then reacted with an amine or a phosphine, and, if necessary, the chlorine ions are replaced with hydroxide ions or other acid anions.

The above-mentioned chloromethylation method is not particularly restricted, and a known method can be used. For example, a process of adding a chloromethylating agent and a catalyst into a solution or suspension of the block copolymer in an organic solvent to chloromethylate the block copolymer can be used. As the organic solvent, there can be exemplified a halogenated hydrocarbon such as chloroform or diehloroethane, but the organic solvent is not limited thereto. As the chloromethylating agent, chloromethyl ether, hydrochloric acid-paraformaldehyde or the like can be used, and as the catalyst, tin chloride, zinc chloride or the like can be used.

The method for reacting an amine or a phophine with the chloromethylated block copolymer is not particularly restricted, and a known method can be used. For example, there can be used a process of adding an amine or phosphine as it is or, if necessary, as a solution in an organic solvent to a solution or suspension of the resulting chloromethylated block copolymer in an organic solvent, or a membrane formed from the solution or suspension according to a known method, and thereby progressing reaction. As an organic solvent for preparing a solution or suspension in the organic solvent, methanol, acetone or the like can be exemplified, but the organic solvent is not limited thereto.

As the amine or phophine, there is no particular restriction, but such ones as shown below can be used preferably.

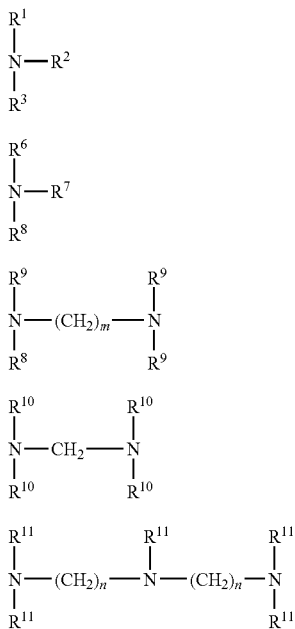

In the above formulae, $R^1$ to $R^3$, $R^6$ to $R^{11}$, m and n have the same meanings as defined hereinbefore. Namely, $R^1$ to $R^3$ represent respectively independently hydrogen atoms or alkyl groups having 1 to 8 carbon atoms, $R^6$ to $R^9$ and $R^{11}$ represent respectively independently hydrogen atoms, methyl groups or ethyl groups, $R^{10}$ represents a methyl group or an ethyl group, in represents an integer of 2 to 6, and n represents 2 or 8, $R^1$ to $R^3$, $R^6$ to $R^9$ and $R^{11}$ are preferably, respectively independently, methyl groups or ethyl groups, and $R^1$ to $R^3$ and $R^6$ to $R^{11}$ are more preferably methyl groups.

By the reaction of the chloromethylated block copolymer with the amine or phosphine, an anion-conducting group as mentioned above is introduced. When monoamine (1) or phosphine (2) is used, an anion-conducting group is introduced into polymer block (A), whereas when a polyamine such as diamine (3) or (4) or triamine (5) is used, it is considered that the polyamine is sometimes introduced as a monovalent anion-conducting group into polymer block (A), and is sometimes introduced as a polyvalent anion-conducting group and crosslinks polymer block (A) themselves and/or crosslinks the aromatic vinyl compound unit themselves within polymer block (A). When $R^1$ to $R^3$ is an alkyl group having 1 to 8 carbon atoms or $R^6$ to $R^9$ and $R^{11}$ are methyl groups or ethyl groups, the anion-conducting group comes to have quaternary ammonium group(s) or quaternary phosphonium group(s).

Since the anion-conducting group introduced has a chlorine ion as the acid anion, the chlorine ion is, if necessary, converted to a hydroxide ion or another acid anion, preferably to a hydroxide ion. The method for converting the chlorine ion to another ion is not particularly restricted, and a known method can be used. For example, when it is converted to a hydroxide ion, a process of immersing the block copolymer with the anion-conducting group introduced into an aqueous solution of sodium hydroxide or potassium hydroxide can be exemplified.

The amount of the anion-conducting group introduced is, as already stated, desirably such an amount that the ion exchange capacity of the block copolymer becomes 0.30 meq/g or more, and more preferably such an amount that the ion exchange capacity of the block copolymer becomes 0.40 meq/g or more. By this, practical anion conductivity performance can be obtained. The ion exchange capacity of the block copolymer into which an anion-conducting group was introduced can be measured using an analytic method such as a titration method, infrared spectroscopic analysis, measurement of nuclear magnetic resonance spectrum ($^1$H-NMR spectrum) or the like.

The second process for producing a block copolymer as used in the invention is a process of producing the block copolymer using at least one monomer having an ion-conducting group.

As a monomer having a cation-conducting group, a monomer wherein an ion-conducting group is bonded to an aromatic vinyl compound is preferred. Specifically, there can be mentioned styrenesulfonic acid, α-alkyl-styrenesulfonic acid, vinylnaphthalene sulfonic acid, α-alkyl-vinylnaphthalenesulfonic acid, vinylanthracenesulfonic acid, α-alkyl-vinylanthracenesulfonic acid, vinylpyrenesulfonic acid, α-alkyl-vinylpyrenesulfonic acid, styrenephosphonie acid, α-alkyl-styrenephosphonie acid, vinylnaphthalenephosphonie acid, α-alkyl-vinylnaphthalenephosphonic acid, vinylanthracenephosphonic acid, α-alkyl-vinylanthracenephosphonic acid, vinylpyrenephosphonic acid, α-alkyl vinylpyrenephosphonic acid, etc. Among them, in view of industrial general-purpose properties, easiness of polymerization and the like, -o-, m- or p-styrenesulfonic acid and α-alkyl -o-, m- or p-styrenesulfonic acid are particularly preferred.

As a monomer having a cation-conducting group, a monomer wherein an ion-conducting group is bonded to a conjugated diene compound can also be used. Specifically, there can be mentioned 1,3-butadiene-1-sulfonic acid, 1,3-butadiene-2-sulfonic acid, isoprene-1-sulfonic acid, isoprene-2-sulfonic acid. 1,3-butadiene- 1-phosphonic acid, 1,3-butadiene-2-phosphonic acid, isoprene-1-phosphonic acid, isoprene-2-phosphonic acid, etc.

As a monomer having a cation-conducting group, there can also be used vinylsulfonic acid, α-alkyl-vinylsulfonic acid, vinylalkylsulfonic acid, α-alkyl-vinylalkylsulfonic acid, vinylphosphonic acid, α-alky 1-vinylphosphonic acid, vinylalkylphosphonic acid, α-alkyl-vinylalkylp hosp home acid, etc. Among them, vinylsulfonic acid and vinylphosphonic acid are preferred.

As a monomer having a cation-conducting group, there can further be used a (meth)acrylic monomer to which an ion-conducting group is bonded. Specifically, methacrylic acid, acrylic acid, 2-acrylamido-2-methyl-1-propanesulfonic acid, etc, can be mentioned.

The cation-conducting group can be introduced in the form of a salt neutralized with a proper metal ion (e.g., an alkali metal ion) or a counter ion (e.g., an ammonium ion). For example, by producing a polymer using sodium o-, m- or p-styrenesulfonate or sodium α-methyl-o-, m- or p-styrenesulfonate, a desired ion-conducting group can be introduced. A block copolymer wherein the sulfonic acid group is converted to a salt form can also be obtained by ion exchange using a suitable method.

As a monomer having an anion-conducting group, groups as shown below can be used.

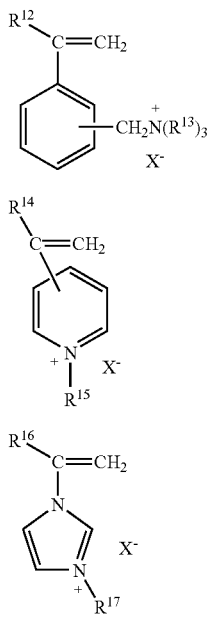

In the formulae, $R^{12}$, $R^{14}$ and $R^{16}$ represent hydrogen atoms, alkyl groups having 1 to 4 carbon atoms, halogenated alkyl groups having 1 to 4 carbon atoms or phenyl groups, $R^{13}$ represents a hydrogen atom or an alkyl group having 1 to 8 carbon atoms, $R^{15}$ and $R^{17}$ represent hydrogen atoms, methyl groups or ethyl groups, X represents a hydroxide ion or an acid anion. In the above, there can be mentioned methyl groups, ethyl groups, n-propyl groups, isopropyl groups, isobutyl groups, etc. as the alkyl groups having 1 to 4 carbon atoms, and chloromethyl groups, chloroethyl groups, chloropropyl groups as the halogenated alkyl groups having 1 to 4 carbon atoms. As the alkyl group having 1 to 8 carbon atoms, there can be mentioned a methyl group, an ethyl group, an n-propyl group, an isopropyl group, an n-butyl group, an n-pentyl group, an n-hexyl group, an n-heptyl group, a 2-ethylhexyl group, etc. The acid anion is not particularly restricted, and there can, for example, be mentioned a halide ion (particularly, chloride ion), ½ $SO_4^{2-}$, $HSO_4^-$, p-toluenesulfonate anion, etc. As $R^{12}$ to $R^{17}$, methyl groups or ethyl groups are preferred, and methyl groups are further preferred. In the above formula (2), the —$C(R^{14})$=$CH_2$ group is preferably bonded to the 4- or 2-position.

Among the monomers having an anion-conducting group, monomers represented by the formula (1) wherein $R^{13}$ is a methyl group or an ethyl group, particularly a methyl group are preferred above all.

As to the block copolymer having cation-conducting groups used in the invention, in the radical stability test at 60° C. which is conducted by adding the block copolymer to a radical reaction reagent obtained by dissolving D-glucose and iron (II) chloride tetrahydrate in an aqueous 3% by mass hydrogen peroxide solution, the mass retention proportion of the block copolymer after 10 hours is preferably 80% or more, more preferably 85% or more and most preferably 90% or more, in view of long-term stability of cell characteristics.

Further, as to the block copolymer having anion-conducting groups used in the invention, in the oxidation stability test at 60° C. which is conducted by adding the block copolymer to an aqueous 3% by mass hydrogen peroxide solution, the mass retention proportion of the block copolymer after 10 hours is preferably 87% or more and more preferably 90% or more, in view of long-term stability of cell characteristics.

The ion-conducting binder of the invention can, if necessary, contain, in addition to the block copolymer used m the invention, a softening agent, in such a range that the effects of the invention are not spoiled. As the softening agent, there are petroleum-type softening agents such as paraffin-, naphthene- or aroma-process oils; paraffins; vegetable oil-type softening agents; plasticizers; etc., and they can be used alone or in a combination of two or more.

The ion-conducting binder of the invention can, if necessary, further contain, in such a range that the effects of the invention are not spoiled, various additives, for example, phenol-type stabilizers, sulfur-type stabilizers, phosphorus-type stabilizers, light stabilizers, antistatic agents, mold release agents, flame retardants, foaming agents, pigments, dyes, brighteners, carbon fiber, etc. alone in a combination of two or more. As specific examples of the stabilizers, there can be mentioned phenol-type stabilizers such as 2,6-di-t-butyl-p-cresol, pentaerythrityl tetrakis [3-3,5-di-t-butyl-4-hydroxyphenyl)propionate], 1,3,5-trimethyl-2,4,6-tris(3,5-di-t-butyl-4-hydroxybenzyl)benzene, octadecyl-3-(3,5-di-t-butyl-4-hydroxyphenyl) propionate, methylene glycol bis[3-(3-t-butyl-5-mehtyl-4-hydroxyphenyl)propionate], 2,4-bis(n-octylthio)-6-(4-hydroxy-3,5-di-t-butylanilino)-1,3,5-triazine, 2,2-thio-diethylene bis [3-(3,5-di-t-butyl-4-hydroxyphenyl)propionate], N,N'-hexamethykmebis(3,5-di-t-butyl-4-hydroxy-hydix)cdnnamide). 3,5-di-t-butyl-4-hydroxy-benzylphsphonate diethyl ester, tris-(3,5-di-t-butyl-4-hydroxybenzyl) isocyanurate and 3,9-bis{2-[3-(3-t-butyl-4-hydroxy-5-methylphenyl)propionyloxy]-1,1-dimethyiethyl}-2,4,8,10-tetraoxaspiro[5,5]undecane; sulfur-type stabilizers such as pentaerythrityl tetrakis(3-laurylthiopropionate), distearyl 3,3'-thiodipropionate, dilauryl 3,3'-thiodipropionate and dismyristyl 3,3'-thiodipropionate; phosphorus-type stabilizers such as tris(nonylphenyl) phosphite, tris(2,4-di-t-butylphenyl) phosphite, distearyl pentaerythritol diphosphite, bis(2,6-di-t-butyl-4-methylphenyl) pentaerythritol diphosphite; etc. These stabilizers can be used alone or in a combination of two or more.

The ion-conducting binder of the invention can, if necessary, further contain, in such a range that the effects of the invention are not spoiled, an inorganic filler. As specific examples of the filler, there can be mentioned talc, calcium carbonate, silica, glass fiber, mica, kaolin, titanium oxide, montmorillonite, alumina, etc.

The content of the block copolymer of the invention in the ion-conducting binder of the invention is preferably 50% by mass or more, more preferably 70% by mass or more and further more preferably 90% by mass or more, in view of ion conductivity.

The inn-conducting binder of the invention is used in the catalyst layer(s) constituting the gas diffusion electrode(s) of a polymer electrolyte fuel cell, or in the joint interface between the electrolyte membrane and the catalyst layer. The ion-conducting binder is preferably used in the electrodes of both sides of the membrane electrode assembly, but can be used only in any one of the electrodes.

As a process for making the ion-conducting binder of the invention adhere on the surface of a catalyst support loaded with a catalyst and thereby binding the catalyst support themselves, and then binding the resulting composite on a gas diffusion layer or an electrolyte membrane, it is possible to apply a catalyst paste prepared by mixing a solution or suspension of the ion-conducting binder with raw material particles such as an electrically conductive catalyst support loaded with a catalyst, on a gas diffusion layer or an electrolyte membrane, or it is also possible to impregnate a solution containing the ion-conducting binder into the catalyst layer of a gas diffusion electrode previously formed.

A solvent to be used in a solution or suspension of the ion-conducting binder of the invention is not particularly restricted so long as it does not destroy the structure of the block copolymer. Specifically, there can be exemplified halogenated hydrocarbons such as methylene chloride; aromatic hydrocarbon solvents such as toluene, xylene and benzene; straight-chain aliphatic hydrocarbons such as hexane and heptane; cyclic aliphatic hydrocarbons such as cyclohexane; ethers such as tetrahydrofuran; alcohols such as methanol, ethanol, propanol and isopropanol; and further, acetonitriie, nitromethane, dimethylsulfoxide, N-methylpyrrolidone, N,N-dimethylformamide, N,N-dimethylacetamide, etc. These solvents can be used alone or in a combination of two or more. Further, a solvent as mentioned above can also be used as a mixed solvent with water so long as the solubility of the ion-conducting binder or the property thereof to be a suspensoid is not spoiled.

It is sufficient if the concentration of the solution or suspension containing the ion-conducting binder is such a concentration that an appropriate coating is easily formed on the catalyst surface of the catalyst layer, and, usually, the concentration is preferably 3 to 10% by mass. When the concentration is too high, there may arise a case where the thickness of the coating as formed on the catalyst surface becomes too large, diffusion of the reaction gas onto the catalyst is inhibited, and/or a uniform catalyst layer cannot be formed to reduce the utilization efficiency of the catalyst, and as a result, the power of the fuel cell is lowered. On the other hand, when the concentration is too low, there may arise a case where the viscosity of the solution or suspension is too small, and when it is applied onto the gas diffusion layer, it penetrates deeply into the inside of the gas diffusion layer to inhibit the diffusion of the gas.

As another process for making the ion-conducting binder of the invention adhere onto the surface of catalyst support in the catalyst layer to bind the catalyst themselves, there can be mentioned a process of mixing powder of the ion-conducting binder with raw material particles such as an electrically conductive catalyst support loaded with a catalyst, and electrostatically applying the resulting mixture onto a gas diffusion layer or an electrolyte membrane.

As a process for using the ion-conducting binder of the invention on the joint interface between the electrolyte membrane and the catalyst layer, there can be mentioned a process of applying a solution or suspension of the ion-conducting binder onto an electrolyte membrane or the surface of the catalyst layer formed in a gas diffusion electrode, binding the electrolyte membrane and the gas diffusion electrode together, and if necessary, making them adhere with heating under pressurization; or a process of electrostatically applying fine powder of the ion-conducting binder onto an electrolyte membrane or the surface of the catalyst layer formed in a gas diffusion electrode, binding the electrolyte membrane and the gas diffusion electrode together, and then making them adhere with heating under pressurization at the softening temperature of the ion-conducting binder or more.

When a solution containing the ion-conducting binder is used on joint interface between the electrolyte membrane and the catalyst layer, the concentration of the solution is preferably 3 to 10% by mass in view of securing adhesion between the polymer electrolyte membrane and the gas diffusion electrode. When this concentration is too low, there may be a case where joint between the electrolyte membrane and the gas diffusion electrode becomes incomplete. On the other hand, when the concentration is too high, application onto the surface of the gas diffusion layer becomes insufficient, and/or penetrating properties into the details are lowered.

A membrane electrode assembly using the ion-conducting binder of the invention is described below. As to production of the membrane electrode assembly, there is no particular restriction, and a known process can be applied. For example, there can be mentioned a process of applying a catalyst paste containing the ion-conducting binder onto a gas diffusion layer by a printing method or a spraying method and drying the paste to form a joint product of the catalyst layer and the gas diffusion layer, and then binding a pair of the joint products, with each catalyst layer being made to be inside, to both sides of the electrolyte membrane by a hot press or the like; or a process applying the catalyst paste onto both sides of an electrolyte membrane by a printing method or a spraying method and drying the paste to form a catalyst layer, and then press binding a gas diffusion layer to each catalyst layer by a hot press or the like. As still another production process, there is a process of applying a solution or suspension containing the ion-conducting binder onto both sides of an electrolyte membrane and/or onto the surfaces of the catalyst layers in a pair of gas diffusion electrodes, binding the electrolyte membrane and the surfaces of the catalyst layers together, and then making them adhere with heating under pressurization or the like. In this case, the solution or suspension can be applied onto any one or both of the electrolyte membrane and the surfaces of the catalyst layers. As further still another production process, there is a process of applying the above catalyst paste onto a film substrate such as one made of polytetrafluoroethylene (PTFE) and drying the paste to form a catalyst layer, transferring a pair of the catalyst layers on the film substrates onto both sides an electrolyte membrane by binding under heating and pressing, peeling off the film substrates to obtain a joint product of the electrolyte membrane and the catalyst layer, and then press binding a gas diffusion layer to each catalyst layer. When the ion-conducting group is a cation-conducting group, it is possible to conduct the above process in a state that the cation-conducting group is made to a salt with a metal such as Na, and restore the proton type by acid treatment after the joint. When the ion-conducting group is an anion-conducting group, it is possible to conduct the above process in such a state that the anion-conducting group is made to be a salt such as a chloride, and restore the hydroxide form by alkali treatment after the joint.

In the membrane electrode assembly of the invention, the ion-conducting binder of the invention is used in at least one of the catalyst layer of the electrode, and the joint interface of the gas diffusion electrode and the electrolyte membrane. The ion-conducting binder is preferably used in both of them, and in the case, the effect of enhancement of the radical resistance or oxidation stability of the fuel cell is remarkable.

In the above membrane electrode assemblies, as the electrolyte membrane constituting the membrane electrode assembly using the cation-conducting binder, there can, for example, be used an electrolyte membrane composed of the existing perfuorosulfonic polymer such as "Nafion" (registered trade mark, made by Du Pont Co.) or "Gore-select" (registered trade mark, made by Gore Co.), an electrolyte membrane composed of a sulfonated polyether sulfone or a sulfonated polyether ketone, an electrolyte membrane composed of a polybenzimidazole impregnated with phosphoric acid or sulfuric acid, etc. It is also possible to make an electrolyte membrane of the block copolymer constituting the cation-conducting binder of the invention. For further heightening the adhesion between the electrolyte membrane and the gas diffusion electrode, it is preferred to use an electrolyte membrane made of the same material as the polymer in the cation-conducting binder used in the gas diffusion electrode.

In the above membrane electrode assemblies, as the electrolyte membrane constituting the membrane electrode assembly using the anion-conducting binder, there can, for example, be used an electrolyte membrane obtained by reacting polychloromethylstyrene with a tertiary amine to form a quaternary ammonium salt, and if necessary, converting the salt into a form of a hydroxide; etc. It is also possible to make an electrolyte membrane of the block copolymer constituting the anion-conducting binder of the invention. For further heightening the adhesion between the electrolyte membrane and the gas diffusion electrode, it is preferred to use an electrolyte membrane made of the same material as the polymer in the anion-conducting binder used in the gas diffusion electrode.

As to the constitutive material of the catalyst layer in the membrane electrode assembly of the invention, there is no particular restriction as an electrically conductive material/catalyst support, and, for example, a carbon material is mentioned. As the carbon material, there can be mentioned carbon blacks such as furnace black, channel black and acetylene black; active carbon; graphite, etc., and these can be used alone or as a mixture of two or more. As the catalyst metal, any metal ca be used so long as it is a metal which promotes oxidation reaction of the fuel such as hydrogen or methanol and reduction reaction of oxygen, and there can, for example, be mentioned platinum, gold, silver, palladium, iridium, rhodium, ruthenium, iron, cobalt, nickel, chromium, tungsten, manganese, etc., and their alloys such as platinum-ruthenium alloy. Among them, platinum or a platinum alloy is used in many cases. The particle size of a metal as the catalyst is, usually, 10 to 300 angstroms. It is advantageous in view of costs to carry such a catalyst on an electrically conductive material/catalyst support such as carbon because of less use amount of the catalyst. If necessary, it is possible to make the catalyst layer contain a water repellent. As the water repellent, there can, for example, be mentioned various thermoplastic resins such as polytetrafluoroethylene, polyvinylidene fluoride, styrene-butadiene copolymers and poly(ether ether ketone).

The gas diffusion layer of the membrane electrode assembly is composed of a material having electrical conductivity and gas permeability and as the material, there can, for example, be mentioned a porous material composed of carbon fiber such as carbon paper or carbon cloth. Such a material can be subjected to water repellent treatment for heightening water repellency.

By inserting a membrane electrode assembly obtained by a process as mentioned above between electrically conductive separator materials having both roles of separation of the electrode chamber and as a path for supplying gas to the electrode, a polymer electrolyte fuel cell can be obtained. The membrane electrode assembly of the invention can be used as a membrane electrode assembly for polymer electrolyte fuel cells such as a hydrogen-dedicated one using hydrogen as the fuel gas, a methanol-reforming one using hydrogen obtained by reforming methanol, a natural gas-reforming one using hydrogen obtained by reforming natural gas, a gasoline-reforming one using hydrogen obtained by reforming gasoline and a direct methanol one wherein methanol is used directly.

A fuel cell using a membrane electrode assembly obtained by the above process is excellent in chemical stability and has an advantage that lowering of power generation characteristic with time lapse is small, and thus can be used stably for a long time.

EXAMPLES

The present invention is further specifically described below through examples, comparative examples and referential examples, but the invention is not limited by them.

Referential Example 1

Production of a block copolymer composed of poly (α-methylstyrene) (polymer block (A)) and hydrogenated polybutadiene (polymer block (B))

In a similar process to a previously reported process (JP-A-2001-172324), a poly (α-methylstyrene)-b-polybutadiene-poly (α-methylstyrene) triblock copolymer (hereinafter abbreviated as mSEBmS) was synthesized. The number average molecular weigh measurement, in terms of polystyrene) of the resulting mSEBmS was 74,000, and the amount of the 1,4-bond determined by $^1$H-NMR measurement was 56% and the content of the α-methylstyrene unit also determined by the $^1$H-NMR measurement was 28.6% by mass. Further, it was revealed by composition analysis through $^1$H-NMR spectrum measurement that α-methylstyrene was not substantially copolymerized into the polybutadiene block.

A solution of the synthesized inSEBmS in cyclohexane was prepared, the solution was put in a pressure proof vessel whose atmosphere had sufficiently been replaced with nitrogen and then, hydrogenation reaction was conducted at 80° C. for 5 hours in the atmosphere of hydrogen using an Ni/Al Ziegler hydrogenating catalyst to obtain a poly (α-methylstyrene)-b-hydrogenated polybutadiene poly (α-methylstyrene) triblock copolymer (hereinafter abbreviated as HmSEBmS). The hydrogenation proportion of the HmSEBmS was calculated by $^1$H-NMR spectrum measurement to be 99.8%.

Referential Example 2

Production of a block copolymer composed of polystyrene (polymer block (A)) and polyisobutylene (polymer block (B))

A polystyrene-b-polyisobutylene-b-poly polystyrene triblock copolymer (hereinafter abbreviated as SiBuS) was prepared according to a previously reported process (JP-A-2000-159815). The number average molecular weight (GPC measurement, in terms of polystyrene) of the triblock copolymer was 68,000, and the content of styrene was 28.0%.

Example 1

(1) Synthesis of a Sulfonated HmSEBmS

A sulfating reagent was prepared by reacting 25.2 ml of acetic anhydride with 11.2 ml of sulfuric acid at 0° C. in 50.2 ml of methylene chloride. Separately 100 g of the block copolymer obtained in Referential example 1 (HmSEBmS) was vacuum dried for 1 hour in a glass-made reaction vessel equipped with a stirrer, the inside atmosphere of the reaction vessel was replaced with nitrogen, 1,000 ml of methylene chloride was added, and the mixture was stirred at 35° C. for 2 hours to dissolve the block copolymer. After the dissolution, the sulfating reagent was gradually added dropwise over a period of 20 minutes. After stirring at 35° C. for 6 hours, the polymer solution was poured into 2 L of distilled water under stirring to coagulate and deposit the polymer. The deposited solid matter was washed with distilled water of 90° C. for 30 minutes, and then filtered. This operation of washing and filtration was repeated until the pH of the washings became unchanged, and the polymer after the final filtration was vacuum dried to obtain a sulfonated HmSEBmS. The sulfonation proportion of the benzene rings of the α-methylstyrene units in the sulfonated HmSEBmS was 52.3% by mol from $^1$H-NMR analysis, and its ion exchange capacity was 1.13 meq/g.

(2) Production of a Membrane

A 5% by mass solution of the sulfonated HmSEBmS obtained in (1) in THF/MeOH (mass ratio 8/2) was prepared, and the solution was cast on a polytetrafluoroethylene sheet at a thickness of about 1,600 μm and sufficiently dried at room temperature to obtain a membrane of 80 μm thickness.

Example 2

(1) Synthesis of a Sulfonated HmSEBmS

A sulfating reagent was prepared by reacting 14.5 ml of acetic anhydride with 6.47 ml of sulfuric acid at 0° C. in 28.9 ml of methylene chloride. Separately, 100 g of the block copolymer obtained in Referential example 1 (HmSEBmS) was vacuum dried for 1 hour in a glass-made reaction vessel equipped with a stirrer, the inside atmosphere of the reaction vessel was replaced with nitrogen, 1,000 ml of methylene chloride was added, and the mixture was stirred at 35° C. for 2 hours to dissolve the block copolymer. After the dissolution, the sulfating reagent was gradually added dropwise over a period of 20 minutes. After stirring at 35° C. for 4 hours, the polymer solution was poured into 2 L of distilled water under stirring to coagulate and deposit the polymer. The deposited solid matter was washed with distilled water of 90° C. for 30 minutes, and then filtered. This operation of washing and filtration was repeated until the pH of the washings became unchanged, and the polymer after the final filtration was vacuum dried to obtain a sulfonated HmSEBmS. The sulfonation proportion of the benzene rings of the α-methylstyrene units in the sulfonated HmSEBmS was 32.0% by mol from $^1$H-NMR analysis, and its ion exchange capacity was 0.71 meq/g.

(2) Production of a Membrane

A membrane of 80 μm thickness was obtained in a similar manner as in Example 1 (2).

(3) Production of a single cell for polymer electrolyte fuel cells (1 M MeOH/air system)

Electrodes for a polymer electrolyte fuel cell were produced according to the following procedure. A THF/MeOH solution of the sulfonated HmSEBmS obtained in (1) (THF:MeOH=8:2, 4.3% by mass) was mixed with a carbon-supported Pt-Ku alloy catalyst to prepare a paste of uniform dispersion. This paste was uniformly applied on one side of carbon paper subjected to a water repellent treatment. The resulting coated carbon paper was allowed to stand at room temperature for several hours, and dried at 80° C. for 1 hour under reduced pressure, A polytetrafluoroethylene sheet was put on the catalyst-coated side, the resulting composite was put between two sheets of heat resistant film, the resulting composite was put between two stainless steel sheets, and the resulting composite was hot pressed (120° C., 100 kg/cm$^2$, 10 minutes) to prepare a carbon paper electrode for an anode side. Separately, a THF/MeOH solution of the sulfonated HmSEBmS obtained in (1) (THF:MeOH=8:2. 4.3% by mass) was mixed with a carbon-supported Pt catalyst, and then a similar procedure was conducted as in the electrode for an anode side to prepare a carbon paper electrode for a cathode side. The prepared electrodes had the following contents, anode: Pt 1.75 mg/cm$^2$, Ru 0.88 mg/cm$^2$, polymer 1.34 mg/cm$^2$, cathode: Pt 1.19 mg/cm$^2$, polymer 1.63 mg/cm$^2$.

Then, the membrane (4 cm×4 cm) prepared in (2) was put between the carbon paper electrode for an anode side and the carbon paper electrode for a cathode side (both 2.5 cm×2.5 cm) (in each electrodes, the polytetrafluoroethylene sheet, the sheets of heat resistant film and the stainless steel sheets were removed) so that the membrane and the catalyst side faced each other, the resulting composite was put between two sheets of heat resistant film, the resulting composite was put between two stainless steel sheets, and the resulting composite was hot pressed (120° C. 100 kg/cm$^2$, 10 minutes) to make a membrane electrode assembly.

The membrane electrode assembly made above (wherein the sheets of heat resistant film and the stainless steel sheets were removed) was put between two sheets of electrically conductive separators also having a role of paths for gas supply, the outsides of the separators were put between two sheets of electric current collectors, and the resulting composite was put between two clamping plates to assemble an evaluation cell for polymer electrolyte fuel cells. In this connection, a gasket was placed between each membrane electrode assembly and each separator for preventing gas leak from a difference in level corresponding to the thickness of the electrode.

Example 3

(1) Synthesis of a Sulfonated HmSEBmS

A sulfonated HmSEBmS having a different amount of the ionic group was obtained in the same sulfonation condition as in Example 2 (1) except that the reaction time was changed to 1 hour. The sulfonation proportion of the benzene rings of the α-methylstyrene units in the sulfonated HmSEBmS was 21.3% by mol from $^1$H-NMR analysis, and its ion exchange capacity was 0.49 meq/g.

(2) Production of a Membrane

A membrane of 80 μm thickness was obtained in a similar manner as in Example 1 (2).

Example 4

(1) Synthesis of a Sulfonated HmSEBmS

A sulfonated HmSEBmS having a different amount of the ionic group was obtained in the same sulfonation condition as in Example 2 (1) except that the reaction time was changed to 10 minutes. The sulfonation proportion of the benzene rings of the α-methylstyrene units in the sulfonated HmSEBmS was 10.1% by mol from $^1$H-NMR analysis, and its ion exchange capacity was 0.23 meq/g.

(2) Production of a Membrane

A membrane of 80 μm thickness was obtained m a similar manner as in Example 1 (2).

Example 5

The sulfonated HmSEBmS synthesized in Example 2 (1) and the sulfonated SEBS synthesized in the following Comparative example 1 (1) were blended at a mass ratio of 80:20, and then, a 5% by mass solution of the blend in THF/MeOH (mass ratio 8/2) was prepared. The solution was cast on a Teflon at a thickness of about 1,600 μm, and sufficiently dried at room temperature to obtain a membrane of 80 μm thickness.

Example 6

The sulfonated HmSEBmS synthesized in Example 2 (1) and the sulfonated SEBS synthesized in Comparative example 1 (1) were blended at a mass ratio of 50:50, and then, a 5% by mass solution of the blend in THF/MeOH (mass ratio 8/2) was prepared. Then, a membrane of 80 μm thickness was obtained in a similar manner as in Example 5.

Comparative Example 1

(1) Synthesis of a Sulfonated SEBS

A sulfating reagent was prepared by reacting 16.9 ml of acetic anhydride with 9.12 ml of sulfuric acid at 0° C. in 41.0 ml of methylene chloride. Separately, 100 g of a SEBS (styrene-(ethylene-butylene)-styrene) block copolymer (made by KURAEAY Co., Ltd., SEPTON 8007) was vacuum dried for 1 hour in a glass-made reaction vessel equipped with a stirrer, the inside atmosphere of the reaction vessel was replaced with nitrogen, 1,000 ml of methylene chloride was added, and the mixture was stirred at 35° C. for 2 hours to dissolve the block copolymer. After the dissolution, the sulfating reagent was gradually added dropwise over a period of 20 minutes. After stirring at 35° C. for 6 hours, the polymer solution was poured into 2 L of distilled water under stirring to coagulate and deposit the polymer. The deposited solid matter was washed with distilled water of 90° C. for 30 minutes, and then filtered. This operation of washing and filtration was repeated until the pH of the washings became unchanged, and the polymer after the final filtration was vacuum dried to obtain a sulfonated SEBS. The sulfonation proportion of the benzene rings of the styrene units in the sulfonated SEBS was 28.0% by mol from $^1$H-NMR analysis, and its ion exchange capacity was 0.73 meq/g.

(2) Production of a Membrane

A membrane of 80 μm thickness was obtained in a similar manner as in Example 1 (2).

Comparative Example 2

(1) Synthesis of a Sulfonated SiBuS

A sulfating reagent was prepared by reacting 10.9 ml of acetic anhydride with 4.84 ml of sulfuric acid at 0° C. in 17.2 ml of methylene chloride. Separately, 100 g of the block copolymer obtained in Referential example 2 (SiBuS) was vacuum dried for 1 hour in a glass-made reaction vessel equipped with a stirrer, the inside atmosphere of the reaction vessel was replaced with nitrogen, 1,000 ml of methylene chloride was added, and the mixture was stirred at 35° C. for 2 hours to dissolve the block copolymer. After the dissolution, the sulfating reagent was gradually added dropwise over a period of 20 minutes. After stirring at 35° C. for 15 hours, the polymer solution was poured into 2 L of distilled water under stirring to coagulate and deposit the polymer. The deposited solid matter was washed with distilled water of 90° C. for 30 minutes, and then filtered. This operation of washing and filtration was repeated until the pH of the washings became unchanged, and the polymer after the final filtration was vacuum dried to obtain a sulfonated SiBuS. The sulfonation proportion of the benzene rings of the styrene units in the sulfonated SiBuS was 29.0% by mol from $^1$H-NMR analysis, and its ion exchange capacity was 0.74 meq/g, (2) Production of a Membrane A membrane of 80 μm thickness was obtained in a similar manner as in Example 1 (2).

Comparative Example 3

As a perfluorocarbonsulfonic acid polymer electrolyte, a Nation film of DuPont Co. (Nafion 112) was chosen. The thickness of the film was about 50 μm, and its ion exchange capacity was 0.91 meq/g.

Tests for Evaluation of Performance of the Polymer Membranes of Examples 1 to 6 and Comparative Examples 1 to 3 as a Cation-Conducting Binder In the following tests, the membrane prepared from the sulfonated block
copolymer in each example or comparative example or the Nafion film was used as a sample, 1) Measurement of Ion Exchange Capacity A sample was weighed (a (g)) in a glass vessel which can be shut tightly, an excess amount of an aqueous saturated solution of sodium chloride was added thereto, and the mixture was stirred overnight. Hydrogen chloride formed in the system was titrated (b (ml)) with a 0.01 N aqueous NaOH standard solution (titer f). The ion exchange capacity of the sample was calculated according to the following equation.

$$\text{Ion exchange capacity} = (0.01 \times b \times f)/a$$

2) Measurement of Proton Conductivity

A sample of 1 cm×3 cm was put between two platinum electrodes, and the composite was set in an open-air cell. The resulting open-air cell was placed in a constant temperature and constant humidity chamber whose inside temperature and relative humidity were adjusted to 80° C. and 90%, respectively, and the absolute value and phase angle of the impedance of the cell were measured under a frequency of 5 to 13 MHz and an applied voltage of 12 mV using an impedance analyzer (HYP4192YA). Graphic processing was conducted based on a Cole-Cole plot of the data obtained to determine proton conductivity.

3) Radical Stability Test

D-glucose and iron (II) chloride tetrahydrate were dissolved in an aqueous 3% by mass hydrogen peroxide solution to prepare a radical reaction reagent. After confirming that the temperature of the radical reaction reagent became constant at 60° C., a sample was added, and reaction was allowed to progress for 5 hour and 10 hours. Then, the sample was sufficiently washed with distilled water.

4) Evaluation of the Power Generation Characteristic of a Single Cell for Fuel Cells The power generation characteristic of the single cell for polymer electrolyte fuel cells produced in Example 2 (3) was evaluated. 1 M MeOH aqueous solution was used as a fuel, and air was used as an oxidizing agent. The test was conducted at cell temperatures of 60, 80 and 100° C. under a condition of MeOH: 5 cc/min and air: 500 cc/min.

Results of the Performance Tests as a Cation-Conducting Binder

The results of measurement of the proton conductivity of the membranes produced in Examples 1 to 6 and Comparative examples 1 to 3 are shown in Table 1.

From comparison of Examples 1 to 3 in Table 1, it was revealed that proton conductivity increases in proportion to the increase of sulfonation proportion. In this connection, proton conductivity could not be measured in Example 4 because the sulfonation proportion was small. Further, from comparison of Example 2, Comparative example 1 and Comparative example 2, it was revealed that the same extent of proton conductivity is displayed in spite of difference in polymer skeletons.

The radical stability test were conducted on the membranes produced in Examples 1 to 6 and Comparative examples 1 to 3. The results of measurement of mass retention proportion and ion exchange capacity retention proportion after 5 hours and 10 hours reaction are shown in Table 2.

It is apparent from Table 2 that, in the membranes produced in Examples 1 to 4 (sulfonated HmSEBmS), even after the 10 hours reaction, any change was not observed on the outside appearance of the membranes, and both mass retention proportion and ion exchange capacity retention proportion exhibited high values, and, thus, the membranes have excellent radical resistance. On the other hand, in the membrane produced in Comparative example 1 (sulfonated SEBS), swelling and white turbidity were observed in proportion to the progress of the reaction, and after the 10 hours test, the proportion of expansion of the length of each side was about 1.6-fold and striking wrinkles were also observed. In the membrane produced in Comparative example 2 (sulfonated SiBuS), there was only small swelling, but white turbidity and wrinkles were observed strikingly, and after the 10 hours reaction, the membrane could not hold its shape and dispersed into the reaction solution as fine powder. Further, in the blend membranes produced in Examples 5 and 6 (sulfonated HmSEBmS / sulfonated SEBS), a tendency was exhibited that radical resistance is lowered in proportion as the proportion of the sulfonated SEBS becomes high. The reason why although sulfonated SiBuS has an isobutylene skeleton excellent in oxidation resistance, it exhibited only low radical resistance as in sulfonated SEBS is thought to be that it has tertiary carbons in the polymer block as an ion channel forming phase to which radicals are surmised to diffuse easily.

On the other hand, in Comparative example 3 where the Nafion film was used, any change was not observed on the outside appearance of the membrane as is the case of the sulfonated HmSEBmS, but its ion exchange capacity changed with time lapse, and after the 10 hours reaction, was lowered even to 79.0%. Since there was almost no mass change, it is surmised that the deterioration is not due to decomposition reaction of the principal chain, but due to elimination of the sulfonic acid groups.

As a power generation characteristic of the single cell for polymer electrolyte fuel cells produced in Example 2 (3), change of voltage as against current density was measured. The results are shown in FIG. 1.

Under a condition of a cell temperature of 60° C. and a fuel supply pressure of 1 MPaG, the open circuit voltage of the single cell was 0.53 V and the maximum power density thereof was 20 mW/cm$^2$. As to cell temperature dependency, in proportion as the temperature becomes high, higher power was obtained, and maximum power density at a cell temperature of 100° C. (fuel supply pressure: 0.1 MPaG) was 43 mW/cm$^2$.

The results of the power generation characteristic of the single cell for polymer electrolyte fuel cells show that the single cell for polymer electrolyte fuel cells obtained in Example 2 (3) displays an excellent power generation characteristic.

TABLE 1

| | Structure of block copolymer | Sulfonation proportion (mol/St) | Ion exchange capacity (meq/g) | Proton conductivity (S/cm) |
|---|---|---|---|---|
| Example 1 | Sulfonated HmSEBmS | 52.3 | 1.13 | $2.5 \times 10^{-2}$ |
| Example 2 | Sulfonated HmSEBmS | 32.0 | 0.71 | $1.0 \times 10^{-2}$ |
| Example 3 | Sulfonated HmSEBmS | 21.3 | 0.49 | $4.0 \times 10^{-4}$ |
| Example 4 | Sulfonated HmSEBmS | 10.1 | 0.23 | Measurement impossible |
| Example 5 | Sulfonated HmSEBmS/ Sulfonated SEBS (80/20 = w/w) | — | 0.72 | $1.0 \times 10^{-2}$ |
| Example 6 | Sulfonated HmSEBmS/ Sulfonated SEBS (50/50 = w/w) | — | 0.73 | $1.1 \times 10^{-2}$ |
| Comparative example 1 | Sulfonated SEBS | 28.0 | 0.73 | $1.2 \times 10^{-2}$ |
| Comparative example 2 | Sulfonated SiBuS | 29.0 | 0.74 | $1.2 \times 10^{-2}$ |
| Comparative example 3 | Nafion 112 | — | 0.91 | $1.6 \times 10^{-1}$ |

TABLE 2

| | Structure of block copolymer | After 5 hours test | | After 10 hours test | |
|---|---|---|---|---|---|
| | | Mass retention proportion (%) | Ion exchange capacity retention proportion (%) | Mass retention proportion (%) | Ion exchange capacity retention proportion (%) |
| Example 1 | Sulfonated HmSEBmS | 97.3 | 92.1 | 96.9 | 88.4 |
| Example 2 | Sulfonated HmSEBmS | 99.0 | 95.3 | 97.9 | 90.0 |
| Example 3 | Sulfonated HmSEBmS | 99.5 | 97.4 | 98.8 | 96.1 |
| Example 4 | Sulfonated HmSEBmS | 99.8 | 99.0 | 99.5 | 98.5 |
| Example 5 | Sulfonated HmSEBmS/ Sulfonated SEBS (80/20 = w/w) | 94.5 | 85.3 | 93.0 | 79.2 |
| Example 6 | Sulfonated HmSEBmS/ Sulfonated SEBS (50/50 = w/w) | 90.0 | 78.4 | 85.0 | 51.3 |
| Comparative example 1 | Sulfonated SEBS | 85.1 | 67.8 | 75.6 | 30.4 |
| Comparative example 2 | Sulfonated SiBuS | 76.9 | 64.2 | Membrane was dispersed into the reaction solution | |
| Comparative example 3 | Nafion 112 | 98.9 | 83.3 | 98.4 | 79.0 |

Example 7

(1) Preparation of HmSEBmS having Quaternary Ammonium Hydroxide Groups 100 g of the block copolymer obtained in Referential example 1 (HmSEBmS) was vacuum dried for 1 hour in a glass-made reaction vessel equipped with a stirrer, the inside atmosphere of the reaction vessel was replaced with nitrogen, 650 ml of chloroform was added, and the mixture was stirred at 85° C. for 2 hours to dissolve the block copolymer. After the dissolution, 135 ml of chloromethyl ethyl ether and 5.7 ml of tin tetrachloride were added, and the mixture was stirred at 35° C. for 3 hours. Then, the resulting reaction solution was added to 4 L of methanol, and the resulting precipitate was washed and dried to obtain chloromethylated HmSEBmS. The chloromethylation proportion of the chloromethylated HmSEBmS was 59.0% by mol of the α-methylstyrene units from $^1$H-NMR analysis.

Then, the chloromethylated HmSEBmS was dissolved in toluene, and the solution was cast on a polytetrafluoroethylene sheet and sufficiently dried at room temperature to obtain a cast membrane of 70 μm thickness. The obtained cast membrane was immersed in a mixed solution of an aqueous 30% trimethylamine solution and acetone at a volume ratio of 1:1 at room temperature for 24 hours to aminate the chloromethyl groups (formation of —$CH_2N^+(CH_3)_3Cl$-groups).

Finally, the animated HmSEBmS membrane was immersed in an aqueous 0.5 N—NaOH solution at room temperature for 5 hours to conduct ion exchange to obtain an HmSEBmS membrane having quaternary ammonium hydroxide groups. The thickness of the membrane was 100 μm and the ion exchange capacity thereof was 1.26 meq/g which was calculated using the value obtained from $^1$H-NMR measurement.

(2) Production of a Single Cell for Polymer Electrolyte Fuel Cells

Electrodes for a polymer electrolyte fuel cell were produced according to the following procedure. A chloroform/isobutyl alcohol solution of the HmSEBmS membrane having quaternary ammonium hydroxide groups obtained in (1) (chloroform: isobutyl alcohol=7:3, 4.3% by mass) was mixed with a carbon-supported Pt catalyst to prepare a paste of uniform dispersion. This paste was uniformly applied on one side of carbon paper subjected to a water repellent treatment, and the resulting coated carbon paper was allowed to stand for several hours to produce a carbon paper electrode. The amount of Pt loaded and the amount of the HmSEBmS having quaternary ammonium hydroxide groups in the produced electrode were 1.0 mg/cm$^2$, respectively. Then, the electrolyte membrane (10 cm×10 cm) prepared in (1) was put between two sheets of the carbon paper electrodes (5 cm×5 cm) so that the membrane and the catalyst side of each electrode faced each other, the resulting composite was put between two sheets of heat resistant film, the resulting composite was put between two stainless steel sheets, and the resulting composite was hot pressed (60° C., 80 kg/cm$^2$, 2 minutes) to make a membrane electrode assembly.

The membrane electrode assembly made above (wherein the sheets of heat resistant film and the stainless steel sheets were removed) was put between two sheets of electrically conductive separators also having a role of paths for gas supply the outsides of the separators were put between two sheets of electric current collectors, and the resulting composite was put between two clamping plates to assemble an evaluation cell for polymer electrolyte fuel cells. In this connection, a gasket was placed between each membrane electrode assembly and each separator for preventing gas leak from a difference in level corresponding to the thickness of the electrode.

Example 8

(1) Preparation of HmSEBmS having Quaternary Ammonium Hydroxide Groups

Similar operations as m Example 7 except that the reaction time of the chloromethyiation m Example 7 was made to be 20 minutes were conducted to obtain a ehloromethylated HmSEBmS. The chloromethyiation proportion of the ehloromethylated HmSEBmS was 23.0% by mol of the α-methylstyrene units from $^1$H-NMR analysis. Then, animation and ion exchange were conducted in a similar way as in Example 7 (1) to obtain an HmSEBmS membrane having quaternary ammonium hydroxide groups. The thickness of the membrane was 100 μm and the ion exchange capacity thereof was calculated based on the value obtained from $^1$H-NMR measurement to 0.49 meq/g.

(2) Production of a Single Cell for Polymer Electrolyte Fuel Cells

An electrode was produced in the same way as in Example 7 (2) except that the HmSEBmS having quaternary ammonium hydroxide groups prepared in the above (1) was used. Then, a membrane electrode assembly and an evaluation cell for polymer electrolyte fuel cells were produced in a similar way as in Example 7 (2) from the membrane prepared m Example 7 (1) and the electrode. The amount of Pt loaded and the amount of the HmSEBmS having quaternary ammonium hydroxide groups in the produced electrode were 0.95 mg/cm$^2$, respectively.

Comparative Example 4

Preparation of a SEBS having quaternary ammonium hydroxide groups 100 g of SEBS (styrene-(ethylene-butylene)-styrene) block copolymer (made by KURARAY Co., Ltd., "SEPTON 8007") was vacuum dried for 1 hour in a glass-made reaction vessel equipped with a stirrer, the inside atmosphere of the reaction vessel was replaced with nitrogen, 750 ml of chloroform was added, and the mixture was stirred at 35° C. for 2 hours to dissolve the block copolymer. After the dissolution, 160 ml of chloromethyl ethyl ether and 6.74 ml of tin chloride were added, and the mixture was stirred at 35° C. for 8 hours. Then, the resulting reaction solution was added to 4 L of methanol, and the resulting precipitate was washed and dried to obtain chloromethylated SEBS. The chloromethylation proportion of the chloromethylated SEBS was 55.1% by mol of the styrene units from $^1$H-NMR analysis.

Then, animation and ion exchange were conducted in a similar way as in Example 7 (1) to obtain an SEBS membrane having quaternary ammonium hydroxide groups. The thickness of the membrane was 100 μm and the ion exchange capacity thereof was calculated based on the value obtained from $^1$H-NMR measurement to 1.31 meq/g.

Tests for Evaluation of Performance of the Polymer Membranes of Examples 7 to 8 and Comparative Example 4 as an Ion-Conducting Binder for Polymer Electrolyte Fuel Cells In the following tests of 1) and 2), the membrane of the block copolymer having quaternary ammonium hydroxide groups prepared in each of Example 7 (1), Example 8 (1) and Comparative example 4 was used as a sample.

1) Measurement of Hydroxide Ion Conductivity

A sample of 1 cm×4 cm was put between a pair of platinum electrodes, and the composite was set in an open-air cell. The resulting open-air cell was placed in a constant temperature and constant humidity chamber whose inside temperature and relative humidity were adjusted to 60° C. and 90%, respectively, and the hydroxide ion conductivity of the sample was measured according to the alternating current impedance method.

2) Oxidation Stability Test

A sample was added into an aqueous 8% by mass hydrogen peroxide solution whose temperature was maintained at 60° C., and reaction was allowed to progress for 5 hours and 10 hours. Then, the sample was immersed in 0.5 N—NaOH for 1 hour, and then sufficiently washed with distilled water and dried, and thereafter, weight measurement and ion conductivity measurement were conducted.

3) Evaluation of the Power Generation Characteristic of a Single Cell for Fuel Cells The power generation characteristic of the single cells for polymer electrolyte fuel cells produced in Example 7 (2) and Example 8 (2) was evaluated. Humidified hydrogen was used as a fuel, and humidified oxygen was used as an oxidizing agent. The test was conducted at a cell temperature of 80° C. under a condition of hydrogen: 500 cc/min and oxygen: 500 cc/min.

Results of the Performance Tests as an Anion-Conducting Binder

The results of the hydroxide ion conductivity measurement and the oxidation stability test conducted on the block copolymers having quaternary ammonium hydroxide groups prepared in Example 7 (1), Example 8 (1) and Comparative example 4 are shown in Table 3. From comparison of Example 7 with Example 8 in Table 3, it was revealed that hydroxide ion conductivity increases in proportion to increase of the proportion of introduction of quaternary ammonium hydroxide groups. From comparison of Example 7 with Comparative example 4, it was revealed that the same extent of hydroxide ion conductivity is displayed in spite of difference in polymer skeletons.

Further, from the results of Table 3, it was revealed that the quaternary ammonium-type anion exchange electrolytes composed of the α-methylstyrene block copolymer used in the present invention have remarkably higher mass retention proportion in the oxidation stability test, compared with the quaternary ammonium-type anion exchange electrolyte composed of SEBS.

Figure 2:
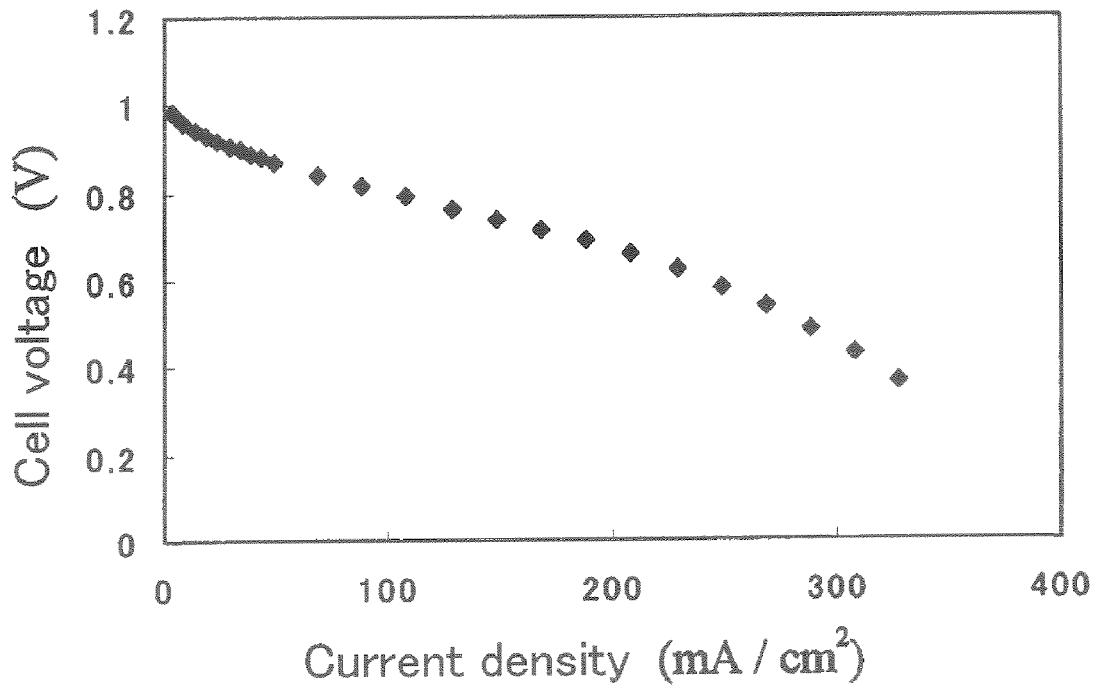
FIG. 2 is a drawing showing the current density-cell voltage of a single cell for anion exchange-type polymer electrolyte fuel cells (Example 7 (2)).
Figure 3:
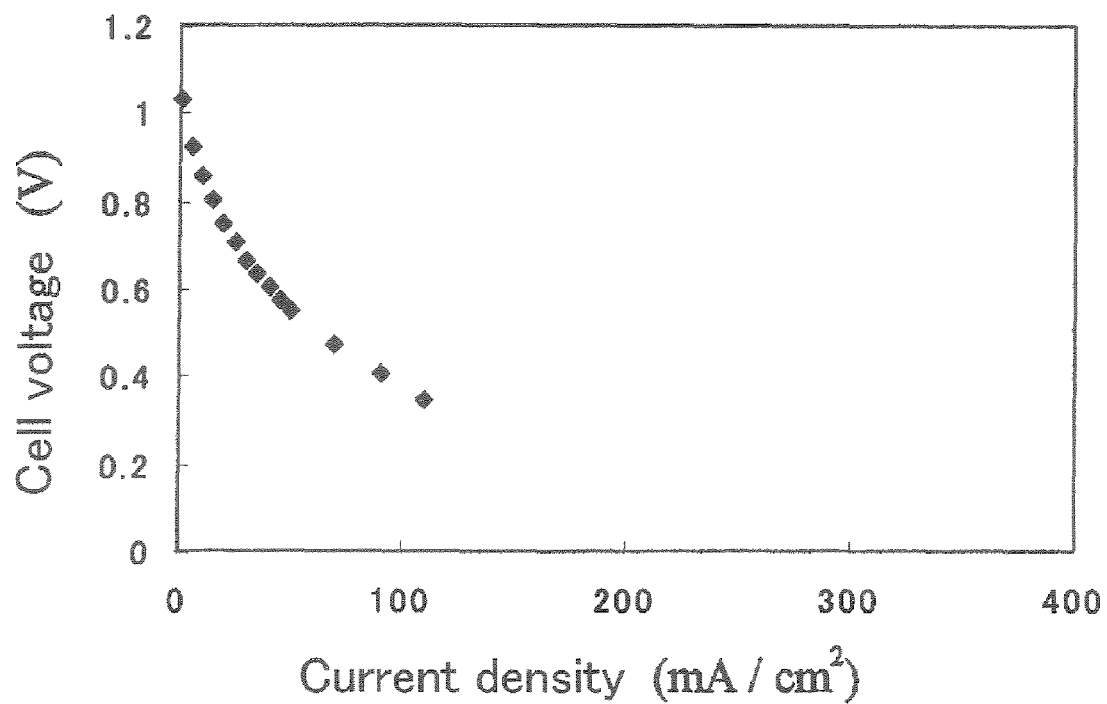
FIG. 3 is a drawing showing the current density-cell voltage of a single cell for anion exchange-type polymer electrolyte fuel cells (Example 8 (2)).

As a power generation characteristic of the single cells for polymer electrolyte fuel cells produced in Example 7 (2) and Example 8 (2), change of voltage as against current density was measured. The results are shown in FIG. 2 and FIG. 3.

The open circuit voltages of the single cells were about 1.0 V, respectively, and the maximum power densities thereof were 145 mW/cm$^2$ in Example 7 and 38 mW/cm$^2$ in Example 8, and it was revealed that the ion-conducting binders of the present invention can he used in polymer electrolyte fuel cells.

INDUSTRIAL APPLICABILITY

The ion-conducting binder of this invention is economical, mild to the environment, excellent in moldability, and further excellent in oxidation stability and thus durability, and therefore, can suitably be used in membrane electrode assemblies and polymer electrolyte fuel cells.

The invention claimed is:

1. An ion-conducting binder used for a membrane electrode assembly for polymer electrolyte fuel cells, the assembly comprising
    a polymer electrolyte membrane; and
    two gas diffusion electrodes stuck to the polymer electrolyte membrane with the membrane put between the electrodes,
    which binder comprises a block copolymer which comprises a polymer block (A) having as a main unit an aromatic vinyl compound unit whose carbon is quaternary carbon, the percentage in the polymer block (A) of the aromatic vinyl compound unit whose α-carbon is quaternary carbon being 50% by mass or more, and a flexible polymer block (B), and has ion-conducting groups on the polymer block (A).

2. The ion-conducting binder according to claim 1, wherein the ion-conducting groups are monovalent cation-conducting groups or anion-conducting groups, and in the latter case, the polymer block (A) has monovalent anion-conducting groups, or polyvalent anion-conducting groups are bonded so as to crosslink the polymer blocks (A) and/or so as to crosslink the aromatic vinyl compound units inside the polymer block (A).

3. The ion-conducting binder according to claim 1, wherein the mass ratio of the polymer block (A) to the polymer block (B) is 95:5 to 5:95.

4. The ion-conducting binder according to claim 1, wherein the aromatic vinyl compound unit whose α-carbon is quaternary carbon is an aromatic vinyl compound unit wherein the hydrogen atom bonded to the α-carbon is replaced with an alkyl group having 1 to 4 carbon atoms, a halogenated alkyl group having 1 to 4 carbon atoms or a phenyl group.

5. The ion-conducting binder according to claim 1, wherein the polymer block (B) is a polymer block comprising at least one unit selected from the group consisting of an alkene unit having 2 to 8 carbon atoms, a cycloalkene unit having 5 to 8 carbon atoms, a vinylcycloalkene unit having 7 to 10 carbon atoms, a conjugated diene unit having 4 to 8 carbon atoms and a conjugated cycloalkadiene unit having 5 to 8 carbon atoms; and a vinylcycloalkene unit having 7 to 10 carbon atoms, a conjugated diene unit having 4 to 8 carbon atoms and a conjugated cycloalkadiene unit having 5 to 8

TABLE 3

|  | After 5 hours test | | After 10 hours test | |
| --- | --- | --- | --- | --- | --- |
|  | Ion conductivity (S/cm) | Mass retention proportion (%) | Ion conductivity (S/cm) | Mass retention proportion (%) | Ion conductivity (S/cm) |
| Example 7 | 1.72 × 10$^{-2}$ | 98 | 1.70 × 10$^{-2}$ | 94 | 1.66 × 10$^{-2}$ |
| Example 8 | 6.10 × 10$^{-3}$ | 100 | 6.10 × 10$^{-3}$ | 98 | 6.00 × 10$^{-3}$ |
| Comparative example 4 | 1.71 × 10$^{-2}$ | 90 | 1.30 × 10$^{-2}$ | 85 | 9.02 × 10$^{-3}$ | carbon atoms in which units, part or all of carbon-carbon double bonds are hydrogenated.

6. The ion-conducting binder according to claim 5, wherein the polymer block (B) is a polymer block comprising at least one unit selected from the group consisting of an alkene unit having 2 to 8 carbon atoms and a conjugated diene unit having 4 to 8 carbon atoms; and a conjugated diene unit having 4 to 8 carbon atoms wherein part or all of carbon-carbon double bonds are hydrogenated.

7. The ion-conducting binder according to claim 1, wherein the aromatic vinyl compound unit whose α-carbon is quaternary carbon is an α-methylstyrene unit, and the polymer block (B) is a polymer block comprising at least one unit selected from the group consisting of a conjugated diene unit having 4 to 8 carbon atoms and a conjugated diene unit having 4 to 8 carbon atoms wherein part or all of carbon-carbon double bonds are hydrogenated.

8. The ion-conducting binder according to claim 1, wherein the ion-conducting group is a cation-conducting group, and the cation-conducting group is a group represented by —SO$_3$M or —PO$_3$HM wherein M represents a hydrogen atom, an ammonium ion or an alkali metal ion.

9. The ion-conducting binder according to claim 8, wherein in the radical stability test at 60° C. which is conducted by adding the block copolymer to a radical reaction reagent obtained by dissolving D-glucose and iron (II) chloride tetrahydrate in an aqueous 3% by mass hydrogen peroxide solution, the mass retention proportion of the block copolymer after 10 hours is 80% or more.

10. The ion-conducting binder according to claim 1, wherein the ion-conducting group is an anion-conducting group, and the anion-conducting group is at least one selected from the following groups of (1) to (13)

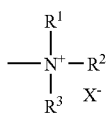
(1)

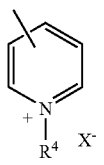
(2)

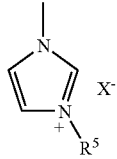
(3)

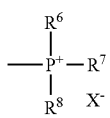
(4)

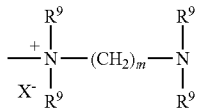
(5)

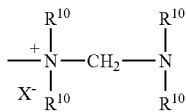
(6)

-continued

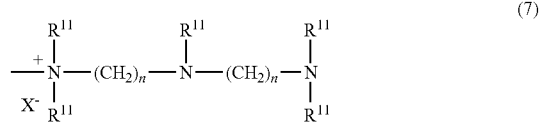
(7)

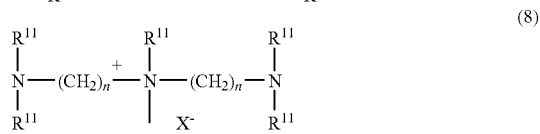
(8)

(9)

(10)

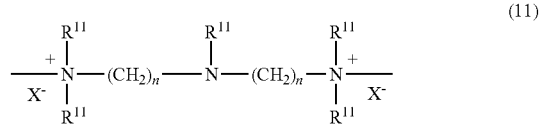
(11)

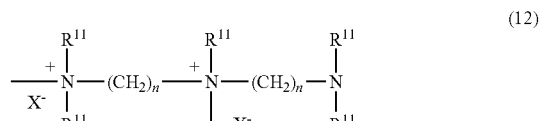
(12)

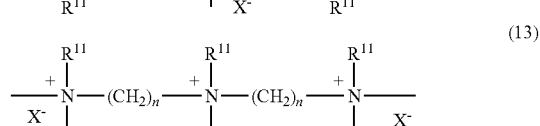
(13)

wherein $R^1$ to $R^3$ represent respectively independently hydrogen atoms or alkyl groups having 1 to 8 carbon atoms, $R^4$ to $R^9$ and $R^{11}$ represent respectively independently hydrogen atoms, methyl groups or ethyl groups, $R^{10}$ represents a methyl group or an ethyl group, $X^-$ represents a hydroxide ion or an acid anion, m represents an integer of 2 to 6, and n represents 2 or 3.

11. The ion-conducting binder according to claim 10, wherein $R^1$ to $R^9$ and $R^{11}$ are methyl groups or ethyl groups, and $X^-$ is a hydroxide ion.

12. The ion-conducting binder according to claim 11, wherein $R^1$ to $R^{11}$ are methyl groups.

13. The ion-conducting binder according to claim 10, wherein in the oxidation stability test at 60° C. which is carried out by adding the block copolymer to an aqueous 3% by mass hydrogen peroxide solution, the mass retention proportion of the block copolymer after 10 hours is 87% or more.

14. The ion-conducting binder according to claim 1, wherein the ion exchange capacity of the block copolymer is 0.30 meq/g or more.

15. A solution or suspension containing the ion conducting binder according to claim 1.

16. A membrane electrode assembly, comprising the ion-conducting binder according to claim 1.

17. A polymer electrolyte fuel cell, comprising the membrane electrode assembly according to claim 16.

* * * * *